(12) United States Patent
Mizuyama et al.

(10) Patent No.: US 8,902,506 B2
(45) Date of Patent: Dec. 2, 2014

(54) LASER SPECKLE REDUCTION ELEMENT

(75) Inventors: Yosuke Mizuyama, Newton, MA (US); Riccardo Leto, Arlington, MA (US)

(73) Assignee: Panasonic Corporation, Osaka (JP)

( * ) Notice: Subject to any disclaimer, the term of this patent is extended or adjusted under 35 U.S.C. 154(b) by 921 days.

(21) Appl. No.: 13/052,591

(22) Filed: Mar. 21, 2011

(65) Prior Publication Data
US 2012/0081786 A1 Apr. 5, 2012

Related U.S. Application Data

(60) Provisional application No. 61/388,238, filed on Sep. 30, 2010.

(51) Int. Cl.
*G02B 27/10* (2006.01)
*G02B 27/48* (2006.01)
*G02B 27/28* (2006.01)

(52) U.S. Cl.
CPC .............. *G02B 27/48* (2013.01); *G02B 27/286* (2013.01)
USPC ....................................... 359/619; 359/486.01

(58) Field of Classification Search
None
See application file for complete search history.

(56) References Cited

U.S. PATENT DOCUMENTS

| | | | |
|---|---|---|---|
| 4,281,993 A * | 8/1981 | Shaw | 434/22 |
| 4,619,508 A * | 10/1986 | Shibuya et al. | 353/122 |
| 4,748,614 A | 5/1988 | Dammann et al. | |
| 5,600,486 A | 2/1997 | Gal et al. | |
| 5,682,265 A | 10/1997 | Fam et al. | |
| 5,801,795 A | 9/1998 | Ogino | |
| 6,169,634 B1 | 1/2001 | Sirat | |
| 7,394,841 B1 * | 7/2008 | Konttinen et al. | 372/45.013 |
| 7,719,738 B2 | 5/2010 | Abu-Ageel | |
| 7,924,684 B2 | 4/2011 | Kaneda et al. | |
| 8,172,141 B2 * | 5/2012 | Knowles et al. | 235/454 |
| 2008/0106779 A1 | 5/2008 | Peterson et al. | |

FOREIGN PATENT DOCUMENTS

| | | |
|---|---|---|
| JP | 2000-268603 | 9/2000 |
| JP | 2008-159348 | 7/2008 |

OTHER PUBLICATIONS

Erdmann et al., "Coherence Management for Microlens Laser Beam Homogenizers", Modeling and Characterization of Light Sources, Proceeding s of SPIE vol. 4774, 2002, pp. 145-154.
US Office Action for U.S. Appl. No. 12/477,325, dated Jul. 25, 2011.
Mayumi Nagayoshi, Keiko Oka, Werner Klaus, Yuki Komai, Kashiko Kodate; Optimal Design and Evaluation of a Color Separation Grating Using Rigorous Coupled Wave Analysis; Faculty of Science Japan Womens University; Aug. 22, 2006, pp. 1-11; Tokyo, Japan.

* cited by examiner

*Primary Examiner* — Arnel C Lavarias
(74) *Attorney, Agent, or Firm* — RatnerPrestia

(57) ABSTRACT

Despeckle elements, laser beam homogenizers and methods for despeckling are provided. The despeckle element includes a transparent material having a first surface including a plural number of optical steps and a second surface having a plural number of microlenses. Each of the number of optical steps is in a one-to-one correspondence with at least one of the microlenses. One of the first surface and the second surface is configured to receive collimated light having a coherence length and a remaining one of the first surface and the second surface is configured to pass the collimated light separated into a plurality of beamlets corresponding to the number of microlenses. A height of each step of at least two of the optical steps is configured to produce an optical path difference of the collimated light longer than the coherence length.

27 Claims, 26 Drawing Sheets

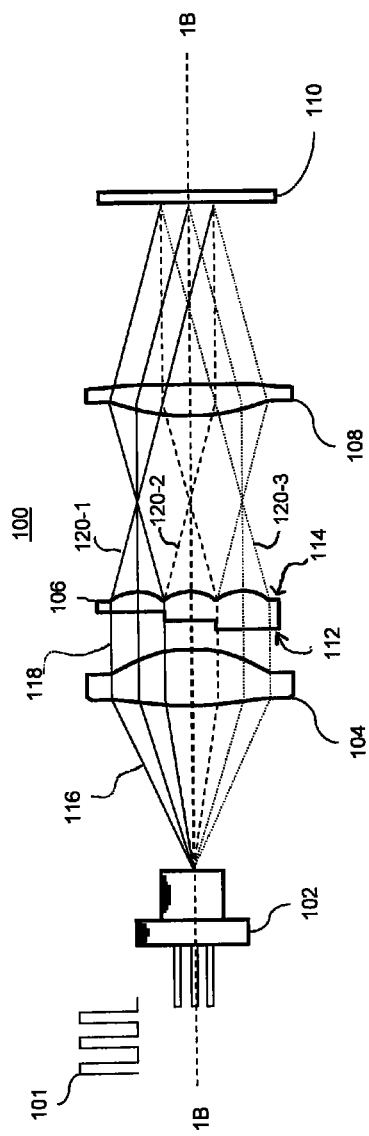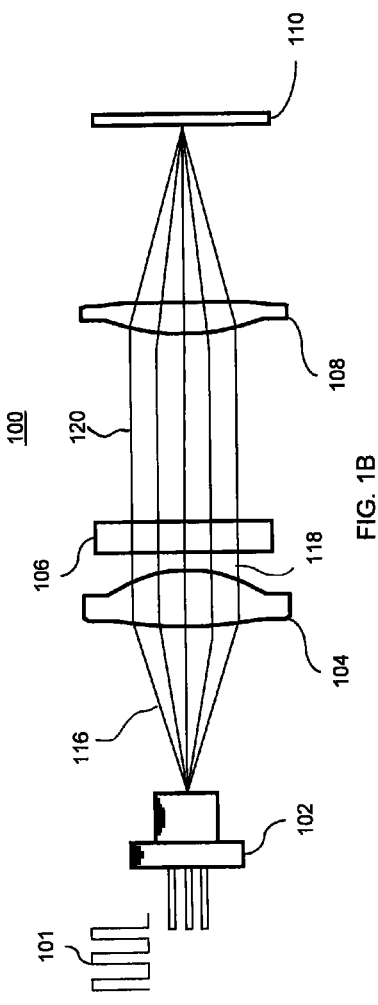
FIG. 1A
FIG. 1B

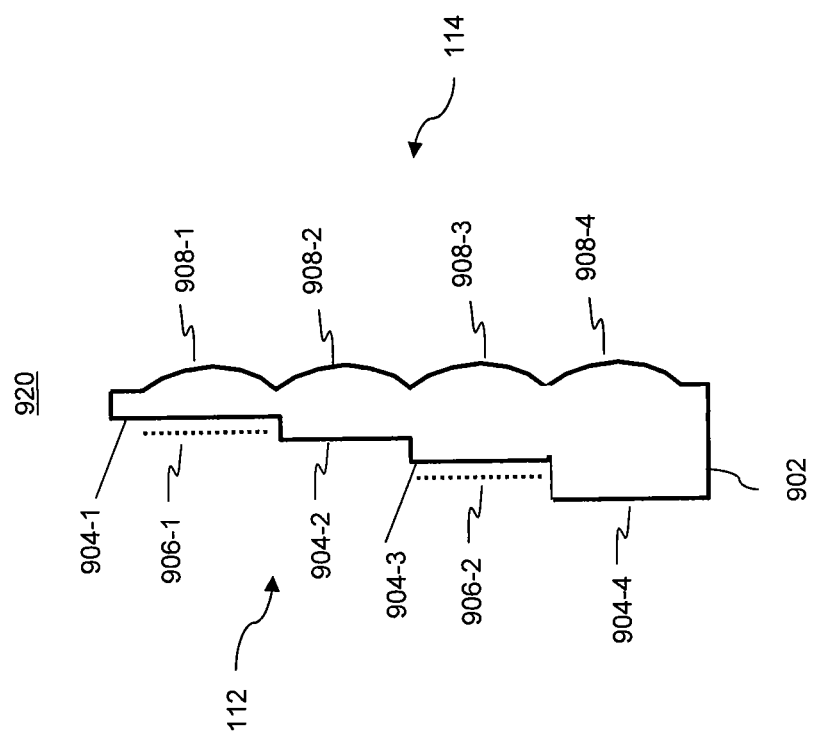

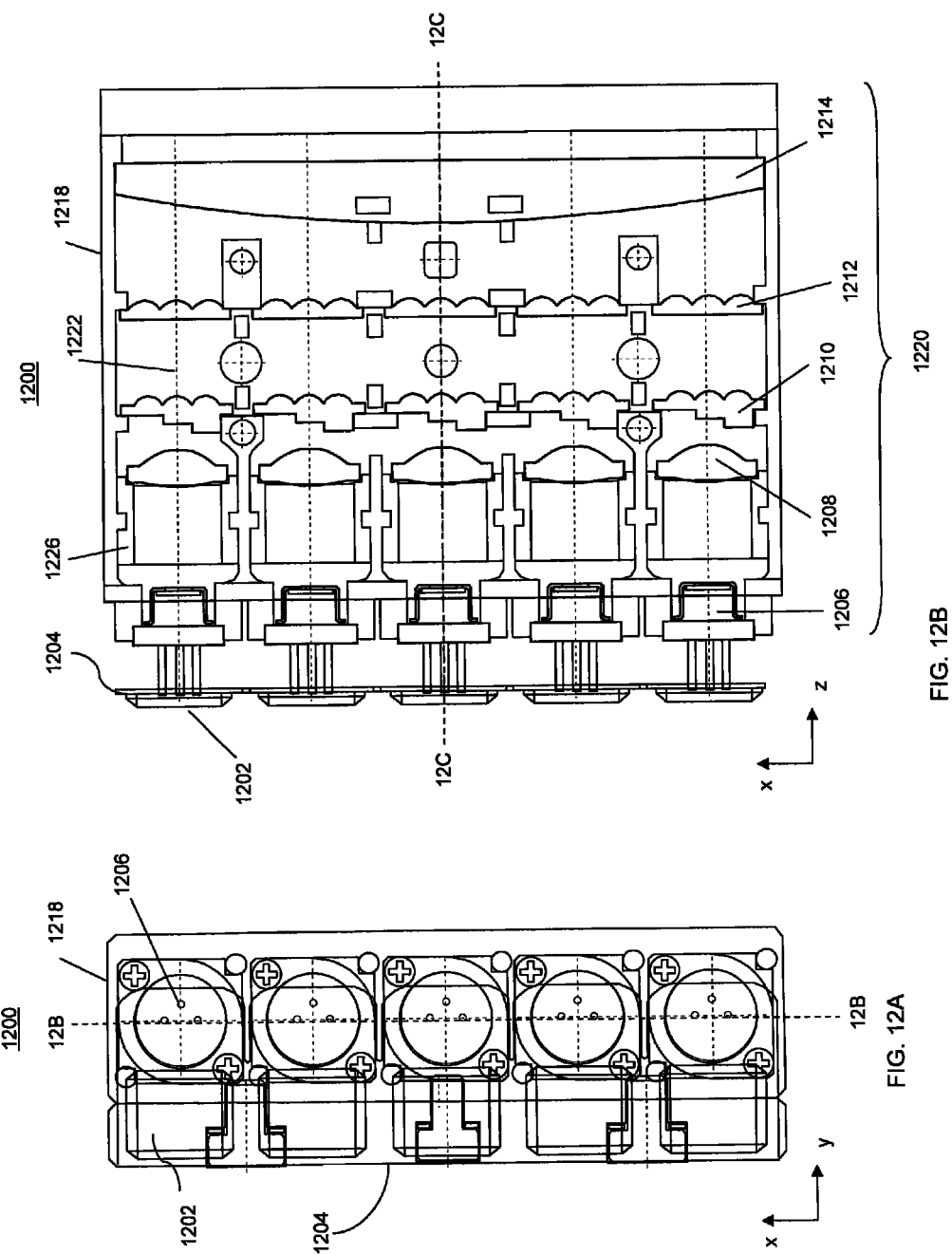

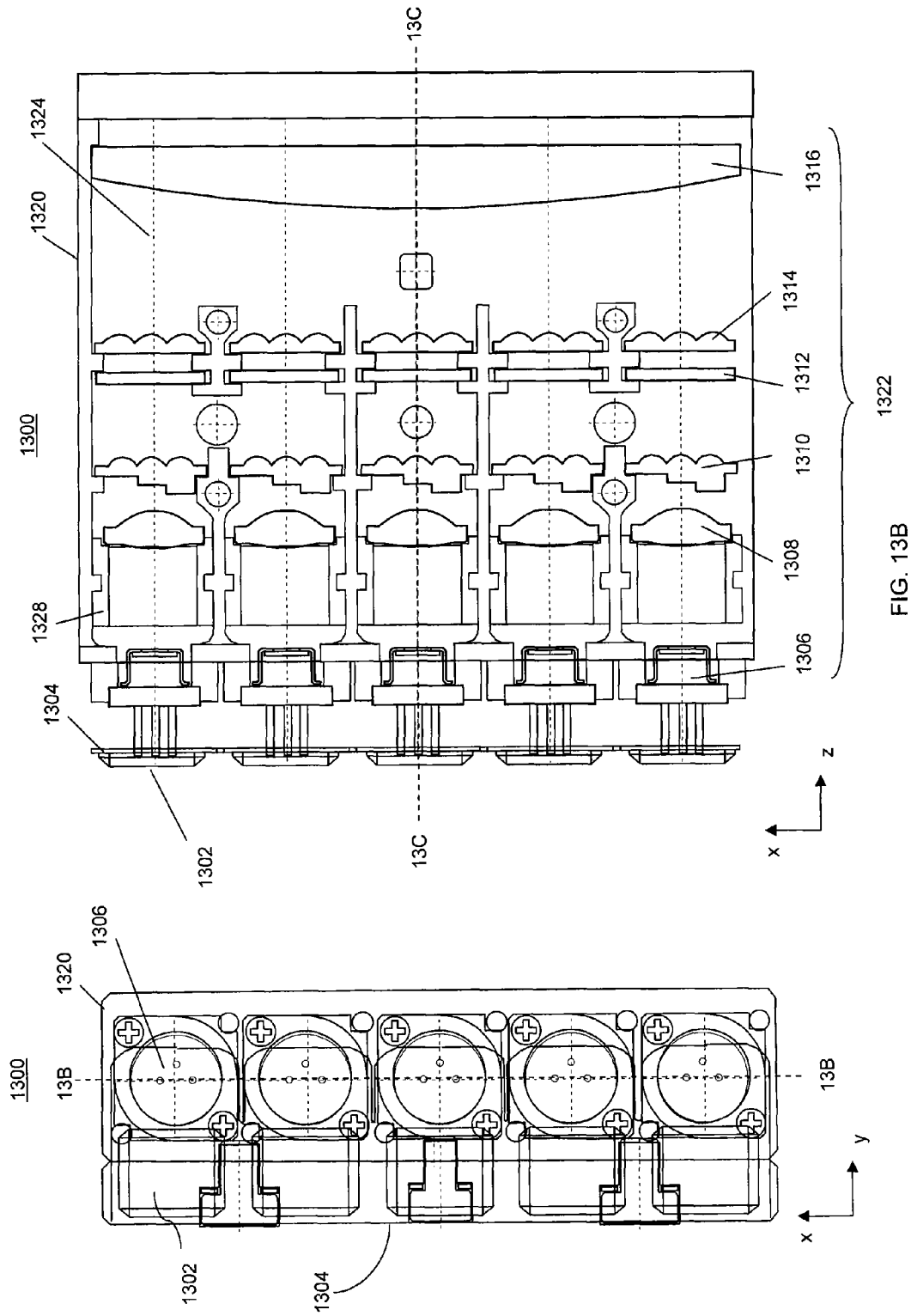

LASER SPECKLE REDUCTION ELEMENT

CROSS REFERENCE TO RELATED APPLICATIONS

The application is related to and claims the benefit of U.S. Provisional Application No. 61/388,238 entitled LASER SPECKLE REDUCTION ELEMENT filed on Sep. 30, 2010, the contents of which are incorporated herein by reference.

FIELD OF INVENTION

The present invention relates to laser illumination and laser displays and, more particularly, to despeckle elements, laser beam homogenizers, despeckling laser arrays and methods of reducing speckle in coherent light sources.

BACKGROUND OF THE INVENTION

Lasers are known, and find application in a wide variety of fields, such as consumer products, medical devices, metrology, and industrial equipment for fabrication, cutting, dicing, heating and annealing. In general, a laser is an optical source that emits a coherent light beam (also referred to herein as coherent light). The coherent light may be emitted as a relatively narrow beam and may be focused to very small spots.

Because they emit coherent light, lasers may be prone to speckle. Speckle is a random intensity pattern on reflection from a diffuse surface generally caused by mutual interference of multiple laser beams from a coherent source reflected from different reflection points. For example, a coherent light beam may be scattered at a rough surface (e.g., a piece of paper, a display screen or a metallic surface). Coherent light scattered by the rough surface can exhibit variation in optical paths between any of two different raised areas on the surface, to produce an interference (speckle) pattern if the optical path is relatively shorter than the coherence length of the laser source. The speckle pattern is typically observed as a random granular pattern.

Speckle patterns may severely degrade the image quality of components illuminated with a laser source, such as laser annealing, laser projection displays and laser microscopes. Accordingly, it may be desirable to reduce or eliminate speckle from a laser source.

SUMMARY OF THE INVENTION

The present invention relates to a despeckle element. The despeckle element includes a transparent material having a first surface including a plural number of optical steps and a second surface opposite the first surface. The second surface has a plural number of microlenses. Each of the number of optical steps is in a one-to-one correspondence with at least one of the microlenses. One of the first surface and the second surface is configured to receive collimated light having a coherence length and a remaining one of the first surface and the second surface is configured to pass the collimated light separated into a plurality of beamlets corresponding to the number of microlenses. A height of each step of at least two of the optical steps is configured to produce an optical path difference of the collimated light longer than the coherence length.

The present invention also relates to a laser beam homogenizer including at least one despeckle element and a field lens. The at least one despeckle element is configured to receive a collimated light beam having a coherence length and to split the collimated light beam into a number of beamlets. The despeckle element includes a first surface including a plural number of optical steps. Each of at least two of the optical steps is configured to produce an optical path difference of the collimated light beam longer than the coherence length. The despeckle element also includes a second surface, opposite the first surface, having a plural number of microlenses. Each of the number of optical steps is in a one-to-one correspondence with at least one of the microlenses. The number of beamlets corresponds to the number of microlenses. The field lens is configured to superimpose the number of beamlets together at an image plane.

The present invention further relates to a method for reducing a coherence of a coherent light beam. The method includes generating a coherent light beam by a pulsed operation of a laser source with a pulse duration to broaden a wavelength bandwidth of the coherent light beam, where the pulsed operation reduces a coherence of the coherent light beam. The method also includes collimating the coherent light beam to produce a collimated light beam and passing the collimated light beam through a transparent despeckle element. Passing the collimated light beam through the transparent despeckle element includes a) generating a number of optical path differences of the collimated light beam by passing the collimated light beam through a plural number of optical steps, to substantially reduce the coherence of the light beam not reduced by the pulsed operation, and b) splitting the collimated light beam into a plurality of beamlets by a plural number of microlenses, where the microlenses are in a one-to-one correspondence the optical steps.

BRIEF DESCRIPTION OF THE DRAWINGS

The invention may be understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 1A and 1B are cross-section diagrams of a laser beam homogenizer with respect to a fast axis and a slow axis of an incident laser beam, respectively, according to an exemplary embodiment of the present invention;

FIGS. 9A, 9B and 9C are cross-section diagrams of a despeckle element including optical wave plates, according to another exemplary embodiment of the present invention;

FIG. 12A is a side-plan view diagram of a despeckling laser array assembly, according to an exemplary embodiment of the present invention;

FIGS. 12B and 12C are cross-section diagrams of the despeckling laser array assembly shown in FIG. 12A, according to an exemplary embodiment of the present invention;

FIG. 13A is a side-plan view diagram of a despeckling laser array assembly, according to another exemplary embodiment of the present invention;

FIGS. 13B and 13C are cross-section diagrams of the despeckling laser array assembly shown in FIG. 13A, according to another exemplary embodiment of the present invention;

DETAILED DESCRIPTION OF THE INVENTION

Figure 2:
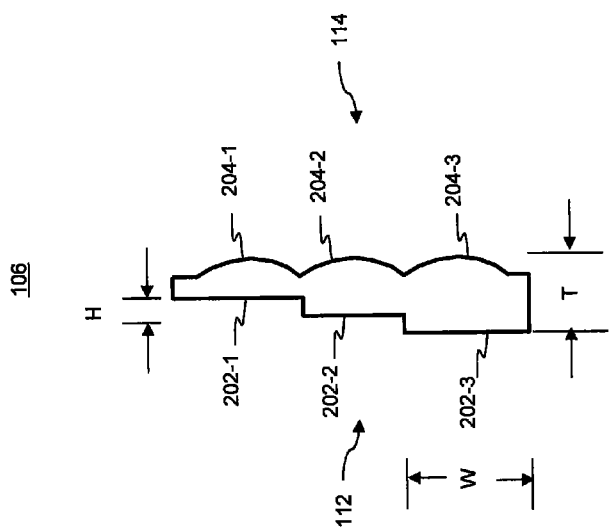
FIG. 2 is a cross-section diagram of a despeckle element used in the laser beam homogenizer shown in FIGS. 1A and 1B, according to an exemplary embodiment of the present invention.

For light of high or moderate coherence, conventional speckle reduction typically involves generating many independent speckle patterns that may average each other out at the image plane. In general, speckle reduction methods may be categorized as belonging to one of dynamic reduction methods and static reduction methods.

Dynamic reduction methods typically involve the use of a time-varying component. For example, vibration of a laser fiber or screen, rotation of a diffuser, random shuttering of a light valve and variation of polarization states with time. Static reduction methods typically involve the use of stationary components. For example, stationary diffusers and stationary optical path difference elements such as an optical fiber bundle in which each of the individual optical fibers have different lengths.

Dynamic reduction methods typically outperform static reduction methods, because the dynamic reduction methods can more effectively average the speckle patterns. However, devices that use dynamic reduction methods tend to be larger than those devices that use static reduction methods, for example, because of the number of additional mechanical components involved to generate the time-varying component. Devices that use static reduction methods may also be large. For example, devices that include static optical path difference elements such as in an optical fiber may use large lengths to produce a substantial optical path difference.

Another technique that may be used to produce a homogenously-illuminated field includes the use of microlens arrays, by splitting the incident laser beam into a number of beamlets, depending on the number of microlenses. Microlens arrays, however, tend to give rise to speckle because they merge the split beamlets.

Referring to FIGS. 1A and 1B, cross-section diagrams are shown of an exemplary laser beam homogenizer 100 (also referred to herein as homogenizer 100), according to an embodiment of the present invention. In particular, FIG. 1A is a cross-section diagram of homogenizer 100 with respect to a fast axis of laser source 102; and FIG. 1B is a cross-section diagram of homogenizer 100 along line 1B-1B with respect to a slow axis of laser source 102.

Homogenizer 100 may include short pulse laser driver 101, laser source 102, collimator 104, despeckle element 106 and field lens 108. In operation, laser source 102 may emit coherent light beam 116. Collimator 104 may collimate coherent light beam 116 received from laser source 102, to form collimated light beam 118. It is understood that collimator 104 may collimate coherent light beam 116 to form collimated light (collimated light with no divergence) or approximately collimated light (collimated light with some degree of divergence).

Despeckle element 106 may receive collimated light beam 118 from collimator 104 via step surface 112 and may split collimated light beam 118 into a plurality of beamlets 120 via microlens surface 114. In particular, collimated light beam 118 may be split into a same number of beamlets (e.g., beamlets 120-1, 120-2, 120-3) as a number of microlenses (e.g., 204-1, 204-2, 204-3 shown in FIG. 2) on microlens surface 114. As described further below, beamlets 120 have a reduced coherence as compared with coherent light beam 116, because step surface 112 acts as optical path difference elements. Beamlets 120 may be superimposed on image plane 110 by field lens 108, to produce a homogenously illuminated field with substantially reduced or eliminated speckle.

In FIGS. 1A and 1B, laser source 102 is illustrated as producing coherent light beam 116 having a fast axis (FIG. 1A) (i.e., a larger divergence angle) and a slow axis (FIG. 1B) (i.e., a smaller divergence angle). Coherent light beam 116 illustrates an elliptically shaped beam. An exemplary beam intensity distribution of coherent light beam 116 is generally a Gaussian distribution, shown in Eq. (1) as:

$$I(x, y) \propto \exp\left[-\frac{2x^2}{w_x^2} - \frac{2y^2}{w_y^2}\right] \tag{1}$$

where $w_x$, $w_y$ are the Gaussian waist size of coherent light beam 116, along the x axis and the y axis, respectively. Although, coherent light beam 116 is illustrated as being elliptically-shaped, it is understood that coherent light beam 116 may have any suitable beam shape, including circularly-shaped, symmetrically-shaped and non-symmetrically-shaped beams.

Laser source 102 may include any suitable laser light source capable of producing coherent light. Examples of laser source 102 include, without being limited to, semiconductor lasers (e.g., laser diodes) including vertical cavity surface emitting lasers (VCSELs), superluminescent diodes (SLDs), light emitting diodes (LEDs), gas lasers, solid-state lasers, disc lasers and fiber lasers. In general, a coherent light source may be characterized by a coherence length defined by the temporal coherence length times the speed of light in a vacuum, where the coherence length in a material may be scaled by the refractive index of the material. Sources having very narrow bandwidths are typically characterized by higher temporal coherence (and larger coherence lengths) than broadband sources. The example embodiments described below use semiconductor lasers.

Speckle typically occurs due to the relatively long coherence of a laser (i.e., high temporal coherence), to cause a high contrast interference pattern (i.e., a speckle pattern) on image plane 110. A visibility (i.e., an interference contrast) of the interference pattern due to the coherent light may be represented by Eq. (2) as:

$$V = \frac{I_{max} - I_{min}}{I_{max} + I_{min}} \tag{2}$$

where $I_{min}$ and $I_{max}$ are minimum and maximum intensities, respectively, of the interference pattern. The visibility may be measured, for example, using a Michelson interferometer, as a function of optical path difference between the coherent light split into two light beams. In general, the visibility is typically high in lasers of long coherence, particularly at locations corresponding to small path differences.

In order to reduce the visibility of the speckle pattern, the intensity spectrum of laser source 102 may be broadened. According to an exemplary embodiment, laser source 102 may be operated at a short pulse (e.g., the gain medium may be driven with a signal having a short pulse, for example, between about 0.5 ns to about 100 ns depending on the laser power). By driving laser source 102 by a short pulse, multi-mode oscillation occurs in laser source 102, thus, broadening the width of the wavelength band. By broadening the wavelength bandwidth, the visibility degrades, according to the Wiener-Khintchine theorem (owing to the Heisenberg uncertainty principle).

Figure 3A:
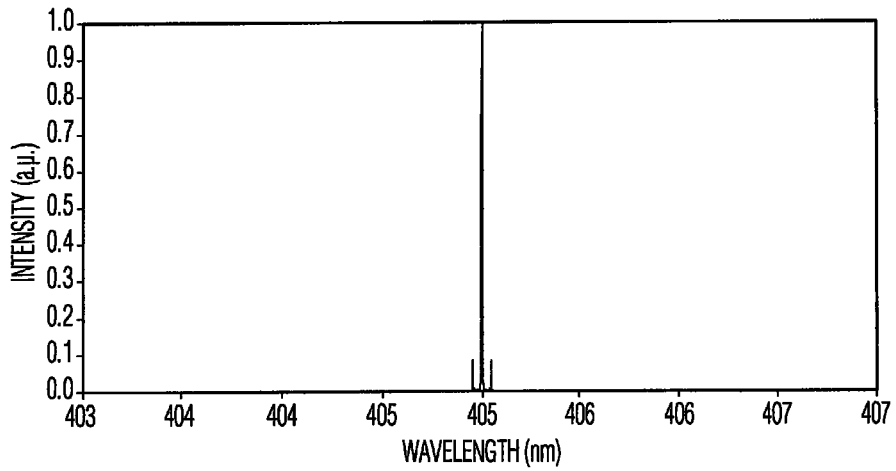
FIG. 3A is an example intensity spectrum as a function of wavelength of a laser in continuous wave (CW) operation.
Figure 3B:
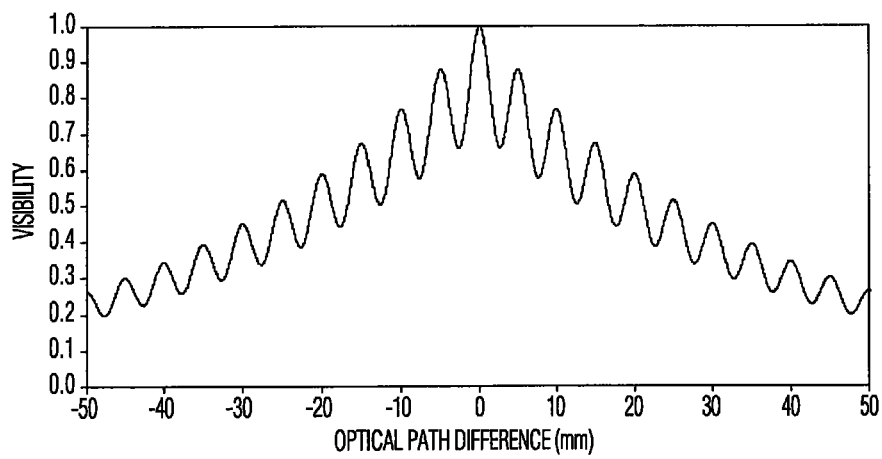
FIG. 3B is an example visibility as a function of optical path difference for the CW-operated laser.
Figure 3C:
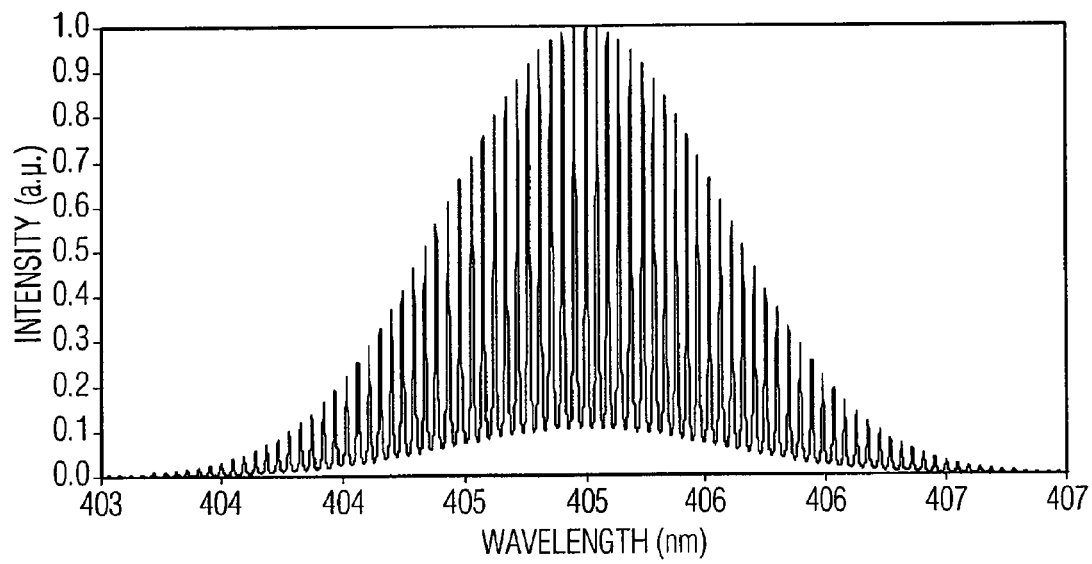
FIG. 3C is an example intensity spectrum as a function of wavelength of a laser in a pulsed operation.
Figure 3D:
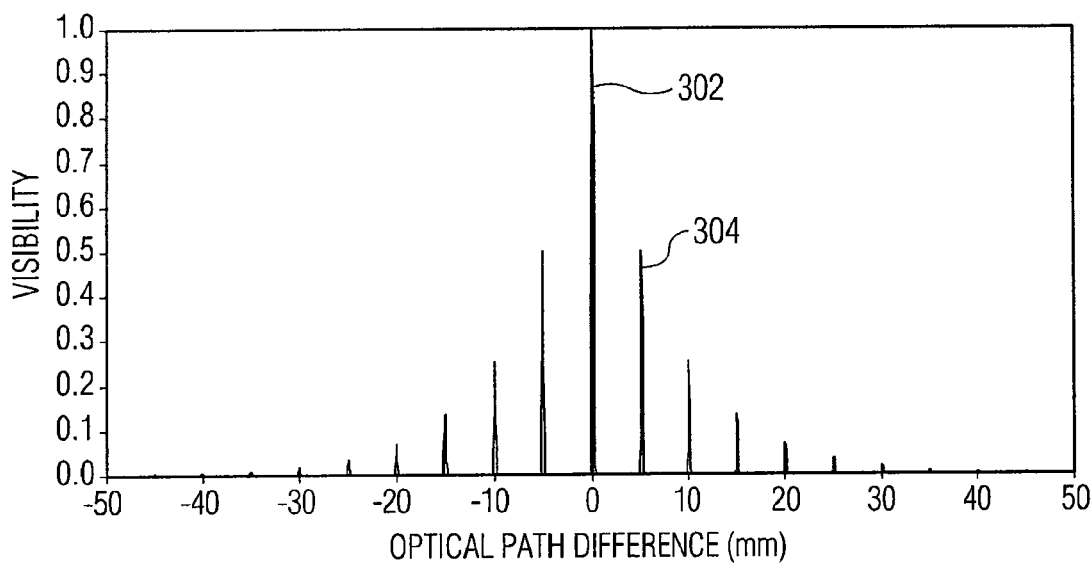
FIG. 3D is an example visibility as a function of optical path difference for the pulse-operated laser.

Referring to FIGS. 3A-3D, examples of wavelength bandwidth broadening and the effect on visibility are shown for an example laser diode operated at 1 ns. In particular, FIG. 3A is an intensity spectrum of the laser diode in CW operation as a function of wavelength; FIG. 3B is a visibility of the laser diode in CW operation as a function of optical path difference; FIG. 3C is an intensity spectrum of the laser diode in a pulsed operation as a function of wavelength of a laser; and FIG. 3D is a visibility of the pulse-operated laser diode as a function of optical path difference.

As shown in FIG. 3A, in CW operation, the laser diode has a very narrow wavelength bandwidth in the intensity spectrum. Because of the narrow wavelength bandwidth, the visibility, as shown in FIG. 3B, is high across a wide range of optical path differences. The intensity spectrum is related to the visibility through the Fourier transformation according to the Wiener-Khintchine theorem. Qualitatively, a narrower bandwidth in the intensity spectrum produces a higher visibility, i.e., high coherence. Accordingly, FIG. 3B indicates that the laser diode, in CW operation at high frequency, has a high coherence.

As shown in FIG. 3C, in short pulse operation, the wavelength bandwidth of the laser diode is broadened. Because of the wavelength bandwidth broadening, the visibility, as shown in FIG. 3D, is substantially reduced across most of the optical path differences. Although a large visibility still exists at main peak 302 (referred to herein as the zero path difference), the remaining peaks 304, which are known as side-mode interference (referred to herein as side-mode peaks), are also substantially reduced (but are not eliminated). The side-mode peaks appear at every optical path difference p calculated by:

$$p = 2nL \tag{3}$$

where n and L are the refractive index and the laser cavity length, respectively. Thus, the laser source operated at a sufficiently short pulse has a substantially reduced (i.e., degraded) coherence. Accordingly, by operating laser source 102 (FIGS. 1A and 1B) at a short pulse, a majority of the interference from different path lengths may be removed.

Referring back to FIGS. 1A and 1B, according to an exemplary embodiment, laser source 102 may be operated with a short pulse of between about 0.5 ns to about 100 ns. For typical semiconductor lasers, after the injection current is injected to the laser diode chip (i.e., the laser resonator cavity), many modes may be excited for the first few nanoseconds. Particularly during this duration time, the wavelength bandwidth may be significantly broadened, because of the multi-mode operation. After the first few nanoseconds, some modes may quickly decay and, thus, only main modes may remain (based on a rate equation for the carriers and the electrons). Therefore, a pulse width of a few nanoseconds may be a particularly effective duration time to reduce the coherence. However, the coherence also depends on the strength of the injection current. A longer pulse width may still produce a broadened wavelength bandwidth if the injection current is low. Some lasers may have poor coherence even when pulsed at 100 ns, for example. An upper limit of an electronically driven short pulse may be about 0.5 ns.

According to aspects of the present invention, the pulse width may be used to broaden the wavelength bandwidth. The operation frequency, in contrast may be a function of a desired average output power of laser source 102. For example, a frequency of 200 MHz may be selected if an average output power of 1 W is desired, for a 2.5 ns pulsed operation with a peak power of 2 W to equivalently achieve a 50% duty ratio. Another example includes a case where only a small output power is desired (for example, as in the application of a laser microscope). In this case, the pulse width is desirably short, while the frequency may be low, which is equivalent to a low duty ratio. Thus, the duty ratio may be determined based on the output power requirement. According to an exemplary embodiment, laser source 102 may include a single mode laser configured to produce multi-mode oscillation, by being driven with a very short pulse. Multi-mode high power diode lasers may also be used. For display purposes, laser source 102 may be pulsed with a duty ratio of more than about 50%, to avoid any potentially dangerous high peak power.

Collimator 104 may collimate coherent light beam 116 to form collimated light beam 118, without substantially changing the beam shape and the beam intensity distribution of coherent light beam 116. Collimator 104 may be a curved focusing lens having a numerical aperture (NA) defined by n sin θ, where n is the refractive index of the medium and θ is the focusing angle, as shown, or any other collimating configuration of optical elements known to persons skilled in the art. Collimator 104 may have any suitable NA for producing collimated light beam 118, include, but not limited to, about 0.3.

The NA of collimator 104 (referred to herein as the collimator NA) may be determined by a desired coupling efficiency, depending on the divergence angles of the laser diodes and an ease of alignment. When the collimator NA is selected so that the focusing angle and the divergence angle of the laser diode are matched, an optimum coupling efficiency may be obtained (i.e., a minimum loss due to vignetting by the collimator aperture is produced). For lasers with very fast divergence angles, a high collimator NA may be selected, for example, greater than or equal to 0.8. The alignment for such a collimator, however, may be difficult and may not be tolerable to alignment error. On the other hand, a low collimator NA may be selected, to reduce the alignment constraints and relax the design tolerance. In this case, however, the coupling efficiency is reduced and more light may be lost (because only a portion of the light cone emitted from laser source 102 may be enclosed inside collimator 104).

Although collimator 104 is illustrated as being separate from laser source 102, it is understood that collimator 104 may be integrated with laser source 102. According to an exemplary embodiment, collimator 104 may include two separate crossed single axis collimators, each of which may collimate one of the fast or slow axes of a laser diode (as laser source 102). This configuration may provide an improved coupling efficiency, because the divergence angles of laser diodes may differ significantly between the fast axis and the slow axis.

Referring to FIGS. 1A, 1B and 2, despeckle element 106 is further described below. FIG. 2 is a cross-section diagram of exemplary despeckle element 106. Despeckle element 106 is desirably a monolithic element including step surface 112 and microlens surface 114 opposite to step surface 112.

Step surface 112 includes steps 202 of different heights. Steps 202 may be configured to form optical path difference elements, which may reduce or substantially eliminate speckle. Microlens surface 114 includes microlens 204, arranged as a one dimensional fly's eye array, alternatively called a lenticular lens. Microlenses 204 may be configured to form a fly's eye illumination system and produce a more homogeneously-illuminated field.

As shown in FIG. 2, each step 202 is formed in a one-to-one correspondence with each microlens 204 (i.e., step 202-1 correspond to microlens 204-1, step 202-2 correspond to microlens 204-2 and step 202-3 correspond to microlens 204-3). In other words, a width and position of each microlens 204-1, 204-2, 204-3 is in a one-to-one correspondence with a width (W) and position of respective step 202-1, 202-2, 202-3.

Despeckle element 106 may be formed of a transparent material having a refractive index (n). Transparent, as used herein, means having substantial optical transmission at those wavelengths at which illumination is intended. Despeckle element 106 may be formed from any suitable transparent material transparent, such as quartz, BK7, sapphire and other optical grade glass, and transparent plastic materials, such as acrylic and polycarbonate. For example, ZEONEX® (manufactured by ZEON Chemical) is a plastic material suitable for ultraviolet (UV) and UV-blue wavelengths in terms of durability.

In FIG. 2, three steps (steps 202-1, 202-2 and 202-3) and three microlenses (microlenses 204-1, 204-2 and 204-3) are shown. It is understood however, that step surface 112 (and microlens surface 114) may include fewer or more steps 202 (and a corresponding number of microlenses 204). In general, despeckle element 202 may include an N number of steps (where N is greater than 2) (and a corresponding N number of microlenses 204), so that steps 202 substantially reduce or eliminate speckle and microlenses 204 provide a more uniformly illuminated field.

The number of steps 202 and microlenses 204 may be determined according to a desired flat top size and quality of uniformity of the illumination, based on the theory for a fly's eye illumination system, as explained below. Let W and $f_m$ stand for the width and focal length of the lenslet of the microlenses, respectively. Let $f_F$ be the focal length of the field lens and let n be the refractive index of the medium. For light of wavelength $\lambda$, design parameters for the fly's eye illumination system may be given in the following equations.

$$\text{Flat top size: } D = \frac{Wf_F}{f_M}, \quad (4)$$

$$\text{Fresnel number: } F \approx \frac{W}{f_M \lambda}, \quad (5)$$

$$\text{Grating pattern period: } P = \frac{f_F \lambda}{nW}. \quad (6)$$

The flat top size (eq. 4) determines the illumination line length in the one dimensional case and the illumination area in the two dimensional case. The Fresnel number (eq. 5) and grating pattern (diffraction) period (eq. 6) determine the quality of the uniformity of the illumination.

In general, the fly's eye illumination system may be designed to produce a sufficiently large Fresnel number, because the uniformity degrades inversely proportional to the Fresnel number. The Fresnel number (eq. 5) represents how many diffraction rings exists in a Fresnel diffraction pattern. In the fly's eye illumination system, each beamlet passing through each lenslet in the microlenses produces a Fresnel diffraction pattern. Each of the Fresnel diffraction patterns produced at each lenslet are superimposed on the image plane and are averaged to form a uniform illumination. If the number of Fresnel diffraction rings is small, large waves exist in a Fresnel diffraction pattern, which may not be averaged or eliminated by the superposition. Thus, a small Fresnel number may produce a poor illumination uniformity. On the other hand, larger Fresnel numbers produce more waves, i.e., many smaller waves in a Fresnel diffraction pattern. The many and smaller waves may be easily washed out and become substantially invisible in the averaged image. The diffraction period (eq. 6) is another indicator of the roughness in the illumination. Diffraction may occur in the fly's eye illumination system, because the fly's eye lens may act as a grating (due to the periodic edges of each lenslet). This diffraction appears on the image plane as a periodic diffraction pattern with the minimum period given by Eq. (6).

Each step 202 has a width W and a height H, with a total thickness T. In FIG. 2, steps 202 are arranged in a staircase configuration. The width W may be determined by a desired system specification but, more importantly, may be determined by considering, as determined by the inventors, that the staircase diffracts the incident light beam at the edge of the staircase. This diffraction perturbs the function of the fly's eye illumination system, by splitting the incident beam into at least $0^{th}$ order diffracted light and $+/-1^{st}$ order diffracted light. The separation of the incident beam is approximately calculated by $$\frac{T\lambda}{nW}, \quad (7)$$

where n is the refractive index of despeckle element 106. It may be desirable to select a larger W, to minimize this separation in order to obtain a more uniform illumination on the image plane. It may also be desirable to select a larger beam size, to include a sufficient number of lenslets for a more pronounced averaging effect.

As shown in FIG. 2, steps 202 monotonically increase in height (i.e., are arranged in a staircase configuration), so that each step 202 has a different height. Steps 202 may also be arranged to randomly varying heights. The optical path difference (OPD) produced by a step 202 with height H is given by $$(n-1)H. \quad (8)$$

In FIG. 2, there is an OPD of $(n-1)H$ between step 202-1 and 202-2; $2(n-1)H$ between step 202-1 and 202-3; and $(n-1)H$ between step 202-2 and 202-3. According to an exemplary embodiment, there may be a path difference between any combination of arbitrary steps 202 among all of steps 202. Thus any combination of two arbitrary beamlets among all of the beamlets has a path difference and has little or no correlation and, hence, speckle may be reduced or eliminated. In FIG. 2, steps 202 monotonically increase by H as 0, H, and 2H but may be configured with any different heights. For example, as 0, H, 3H; or 1H, 3H, 5H. Also steps 202 may randomly increase. For example, as 0, 2H, 1H; 0, 3H, H; or 1H, 5H, 3H. In an exemplary embodiment, steps 202 have a height H of less than about 1 mm.

As described above, laser source 102 may be configured to provide coherent light beam 116 having a substantially reduced coherence. However, as shown in FIG. 3D, there is still a high coherence (i.e., interference) at zero path difference peak 302. Accordingly, steps 202 may be configured as optical path difference elements, to substantially reduce or eliminate the remaining interference (i.e., interference not reduced by laser source 102).

If an optical path difference is introduced between two (or more) portions of coherent light beam 116 that exceeds the coherence length, the ability for interference to occur between the portions is substantially reduced. Accordingly, all beamlets 120 emerging from microlens surface 114 may become interference free (i.e., having substantially no speckle). Because pulsed laser source 102 substantially reduces the coherence except for zero path difference peak 302, height H of steps 202 may be selected to be greater than the coherence length and less than the first coherence revival length (i.e., the length to the first side-mode peak 304 (FIG. 3D) from zero path difference peak 302). For example, referring to FIG. 3D, If the zero path difference peak 302 drops to nearly zero at a path difference of about 0.5 mm, the optical path difference element may be configured to have a step height of $0.5/(n-1)$ (taking into account the refractive index n of the material of despeckle element 106). It is understood that a step height of $0.5/(n-1)$ represents an example.

For example, the step height H may be selected as 1 mm for despeckle element 106 of refractive index of 1.5, because the minimum OPD is $(n-1)H=0.5$ mm. For a step height of 0, H, 2H for three steps 202, the OPDs are 0.5 mm, 1.0 mm and 1.5 mm, respectively and the visibility for all of the OPDs is nearly zero. For more than three steps 202, one or more OPDs of all possible OPDs may match the length of side-mode peak 304 (FIG. 3D). It may be desirable to design the beam size, microlens size, step size, and step height so that the any of the OPDs are far enough from the side-mode peaks 304 (FIG. 3D). The OPD may be even larger than the first side-mode peak 304 (FIG. 3D) if there are no limitations in the physical size.

Although steps 202 are illustrated as having a same width W, the width of each step 202 may be individually varied. Although steps 202 are illustrated as each having a monotonically increasing height, it is understood that the height H of each step 202 may also be individually varied. It is further understood that a radius of curvature for individual microlenses 204 may be adjusted to compensate for any variation in the width W of steps 202, so that the microlenses all have the same focal length.

In FIG. 2, despeckle element 106 illustrates physical steps 202 arranged as a staircase to introduce optical path differences, in order to substantially remove any coherence from collimated light beam 118. Step surface 112 is not limited to physical steps to reduce the coherence. In general, steps 202 represent optical steps that may be used to reduce the coherence. Step surface 112 may also include differences in polarization (described below with respect to FIGS. 9A-10B) and differences of refractive index. For example, different refractive indices may be introduced into step surface 112 of despeckle element 106 by selection of material or by coating, or doping, or implantation of materials, or in any other manner.

Accordingly, despeckle element 106 provides a reduction in coherence, based on step surface 112. In addition, despeckle element 106 includes microlens surface 114, which splits collimated light beam 118 into a plurality of beamlets 120-1, 120-2, 120-3, such that the number of beamlets 120 (e.g., three beamlets 120) correspond to the number of microlenses (e.g., three microlenses 204). Microlenses 204 may be configured to focus beamlets 120 to a point before or onto field lens 108.

If despeckle element 106 only includes microlens surface 114, without step surface 112, microlenses 204 would produce a more homogenously illuminated field at image plane 110. However, beamlets 120 may still interfere with each other and produce speckle.

Interference (i.e., speckle) may occur when multiple beamlets 120 come together at one spatial point. In conventional illumination systems using coherent light sources, interference may be caused by microlenses as they split a collimated light beam into multiple beamlets. Accordingly, it is desirable to ensure that beamlets 120 from each microlens 204 have a reduced correlation, to avoid interference at image plane 110. Accordingly to aspects of the present invention, by providing a one-to-one correspondence between steps 202 and microlenses 204, interference between beamlets 120 may be reduced.

In FIGS. 1A, 1B and 2, despeckle element 106 is illustrated as a one dimensional array, with a one dimensional array of steps 202 and a one dimensional array of microlenses 204 extending in the fast axis. In this example, microlenses 204 may be formed as lenticular lenses. It is understood that despeckle element 106 is not limited to a one-dimensional array and may include a two-dimensional array configuration. If coherent light beam 116 has a circular beam shape, for example, despeckle element 106 may be formed as a two dimensional array of steps 202 and microlenses 204, described further below with respect to FIGS. 5-6.

Referring back to FIGS. 1A and 1B, beamlets 120 are directed to field lens 108. Field lens 108 (e.g., a Fourier lens) may superimpose the multiple beamlets 120 together at image plane 110 (e.g., a specimen position) located near a focus position, leading to a homogenously illuminated field. Field lens 108 may be positioned anywhere between despeckle element 106 and image plane 110. The position of field lens 108 may be used to change the energy distribution (e.g., from a Gaussian profile to a flat-top profile) at image plane 110 by coarse positioning across the focus or to change the energy level of a flat-top profile by fine positioning across near focus.

According to aspects of the present invention, exemplary homogenizer 100 produces coherent light beam 116 with reduced coherence and includes monolithic despeckle element 106, which further reduces the coherence. Accordingly, homogenizer 100 may effectively eliminate speckle, with a static configuration of elements, where the size of the elements may be very small. By including microlens surface 112 and field lens 108, the averaging effect by beamlets 120 may be increased.

Figure 4:
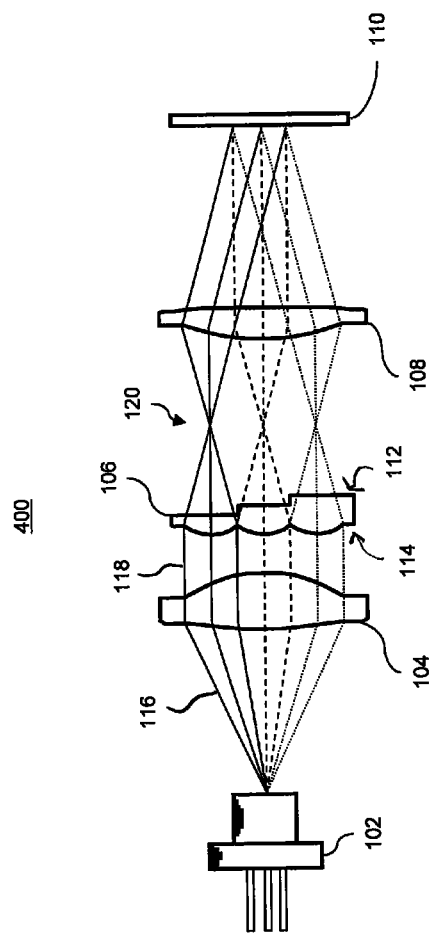
FIG. 4 is a cross-section diagram of a laser beam homogenizer, according to another exemplary embodiment of the present invention.

Although FIGS. 1A and 1B illustrate despeckle element 106 with step surface 112 receiving collimated light beam 118, despeckle element 106 is not limited to this configuration. Referring to FIG. 4, a cross-section diagram of laser beam homogenizer 400 is shown, according to another exemplary embodiment of the present invention. Homogenizer 400 is similar to homogenizer 100 (FIG. 1A), except that despeckle element 106 is positioned to receive collimated light beam 118 at microlens surface 114 and to provide beamlets 120 from step surface 112.

Figure 5B:
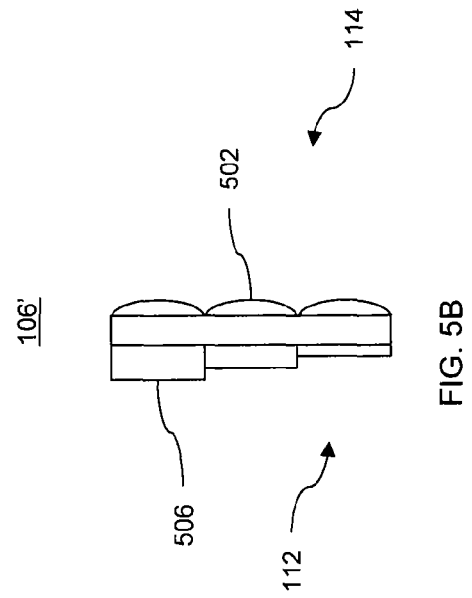
FIGS. 5A and 5B are respective cross-section diagrams of the despeckle element shown in FIG. 5, according to an exemplary embodiment of the present invention.
Figure 5:
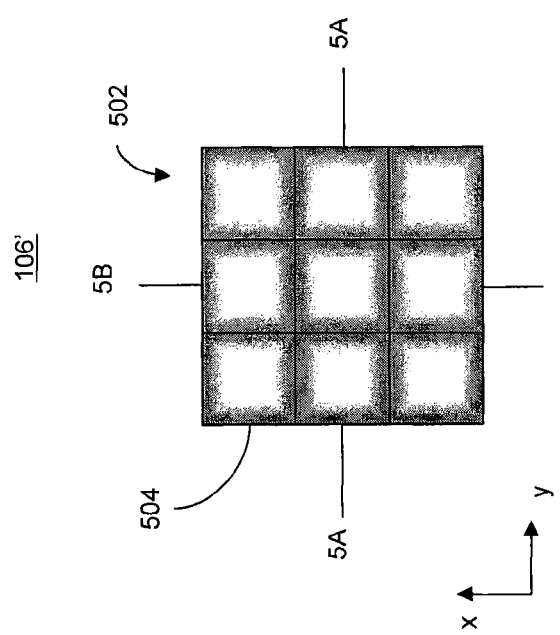
FIG. 5 is a top-plan view diagram of a two-dimensional despeckle element, according to another exemplary embodiment of the present invention.
Figure 5A:
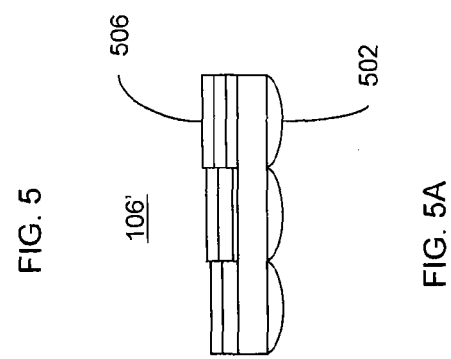

Referring next to FIGS. 5, 5A, 5B and 6, an exemplary two-dimensional despeckle element 106' configured as a two-dimensional array is described, according to an exemplary embodiment of the present invention. In particular, FIG. 5 is a top-plan view diagram of despeckle element 106' (viewed from microlenses 502); FIGS. 5A and 5B are respective cross-section diagrams of despeckle element 106' along respective lines 5A-5A and 5B-5B; and FIG. 6 is a diagram illustrating an example number of steps corresponding to each cell 504 of despeckle element 106'.

Despeckle element 106' is similar to despeckle element 106 (FIG. 2) except that despeckle element 106' is configured as a two-dimensional array having a two-dimensional fly's eye array of microlenses 502 and a two-dimensional array of steps 506. Each microlens 502 is formed in a one-to-one correspondence with each step 506 over a plurality of cells 504 (e.g., a 3×3 arrangement of cells 504). As shown in FIGS. 5A and 5B, step surface 112 includes steps 506 configured as a staircase in both the x direction and the y direction in units of unit height H. For example, the unit height may be 1 mm.

Figure 6A:
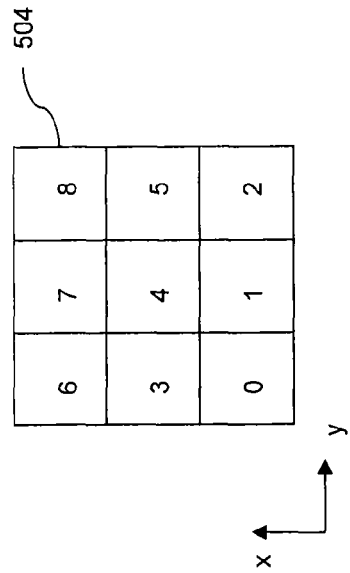
FIGS. 6A and 6B are bottom-plan view diagrams of the despeckle element shown in FIG. 5, illustrating example numbers of steps corresponding to each cell of the despeckle element, according to exemplary embodiments of the present invention.
Figure 6B:
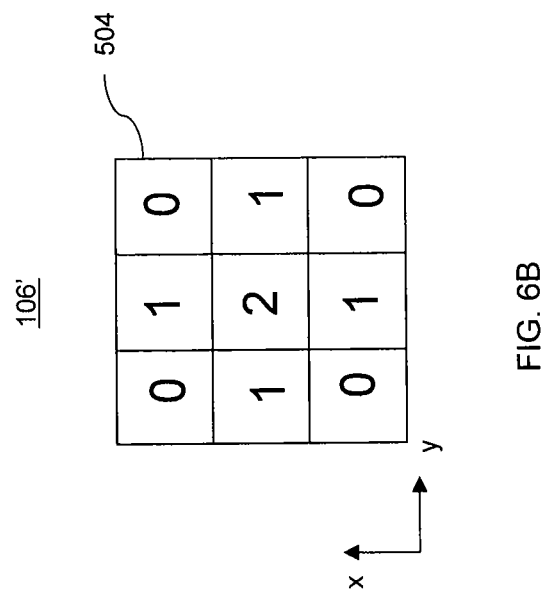

FIGS. 6A and 6B provide example numbers of steps (associated with step height) for each cell 504 of despeckle element 106' in the 3×3 configuration. As illustrated in FIG. 6A, the step height increases in both the x and y directions in unit height H. It is understood that each of FIGS. 6A and 6B represents an example distribution of step heights of steps 506 and that the step heights may be selected in other suitable distributions.

According to another embodiment, some of the cells 504 may have a same step height. By using a same step height for some of cells 504, the total step height may be reduced. According to another exemplary embodiment, the step height distribution may be symmetric across despeckle element 106'. FIG. 6B illustrates a symmetric step height distribution. With a symmetric distribution, beamlets 120 (FIG. 1A) from a same step height may interfere with each other but may still provide suitable speckle reduction. According to an exemplary embodiment, an optimum flat top energy distribution in image plane 110 (FIG. 1A) may be obtained when all combinations of two steps out of the nine steps heights are not the same. Although FIG. 6B illustrates a two-dimensional despeckle element 106' with a symmetric distribution, a one-dimensional despeckle element 106 (FIG. 2) may also be arranged with a similar symmetric distribution of step heights.

Figure 7A:
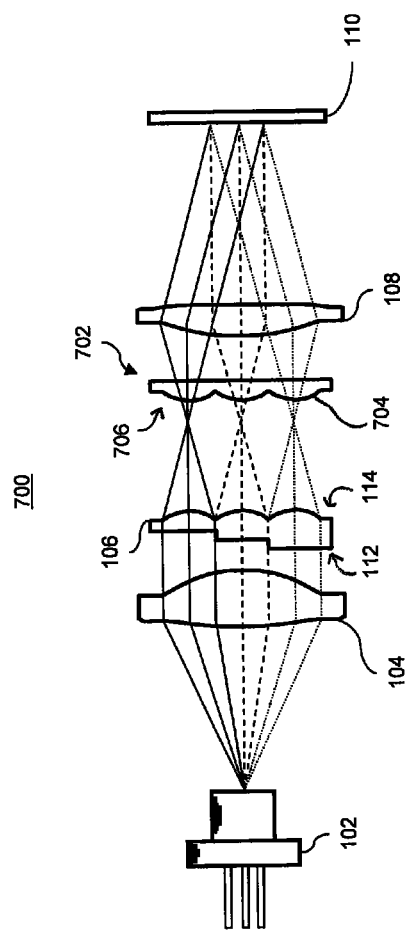
FIGS. 7A, 7B, 7C and 7D are cross-section diagrams of a laser beam homogenizer, according to another exemplary embodiment of the present invention.

Referring next to FIG. 7A, a cross-section diagram of another exemplary laser beam homogenizer 700 is shown with respect to a fast axis of coherent light beam 116. Homogenizer 700 is similar to homogenizer 100 (FIG. 1A), except that homogenizer 700 includes microlens array 702 in addition to despeckle element 106. Microlens array 702 includes microlenses 704 arranged along microlens surface 706.

Microlens array 702 may be positioned between despeckle element 106 and field lens 108, with microlens surface 706 facing microlens surface 114 of despeckle element 106. Microlens array 702 may be configured to further improve the uniformity of the energy distribution at image plane 110. Microlens array 702 desirably includes a phase function that is substantially identical to a phase function of microlenses 204 (FIG. 2) of despeckle element 106. The position of microlens array 702 relative to field lens 108 may be selected for a desired top hat beam width.

Microlens array 702 may include a one dimensional array of microlens 704 to correspond with despeckle element 106, as described with respect to FIGS. 1A and 1B. According to another embodiment, despeckle element 106 may be replaced by two-dimensional despeckle element 106' (FIG. 5). Accordingly, in this case, microlens array 702 may include a two dimensional array of microlenses 704.

Figure 7B:
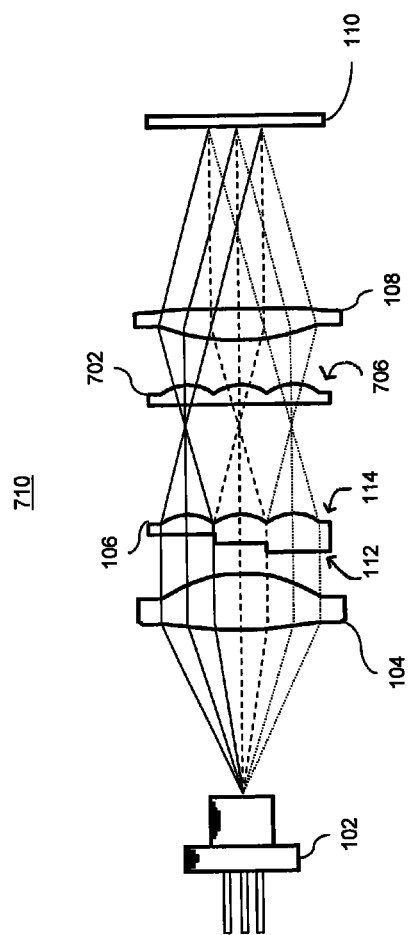
Figure 7C:
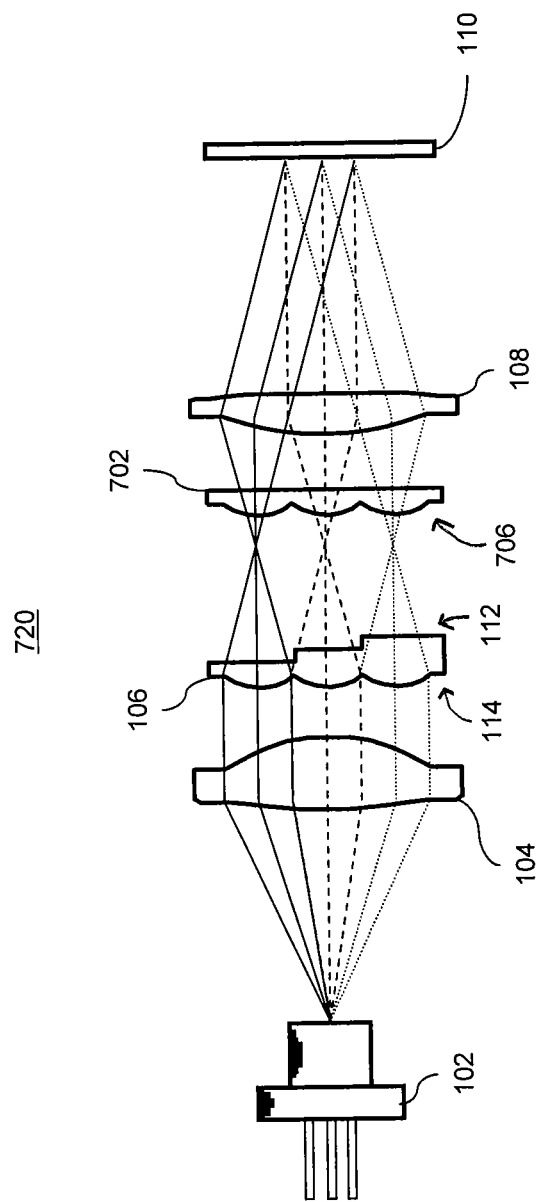
Figure 7D:
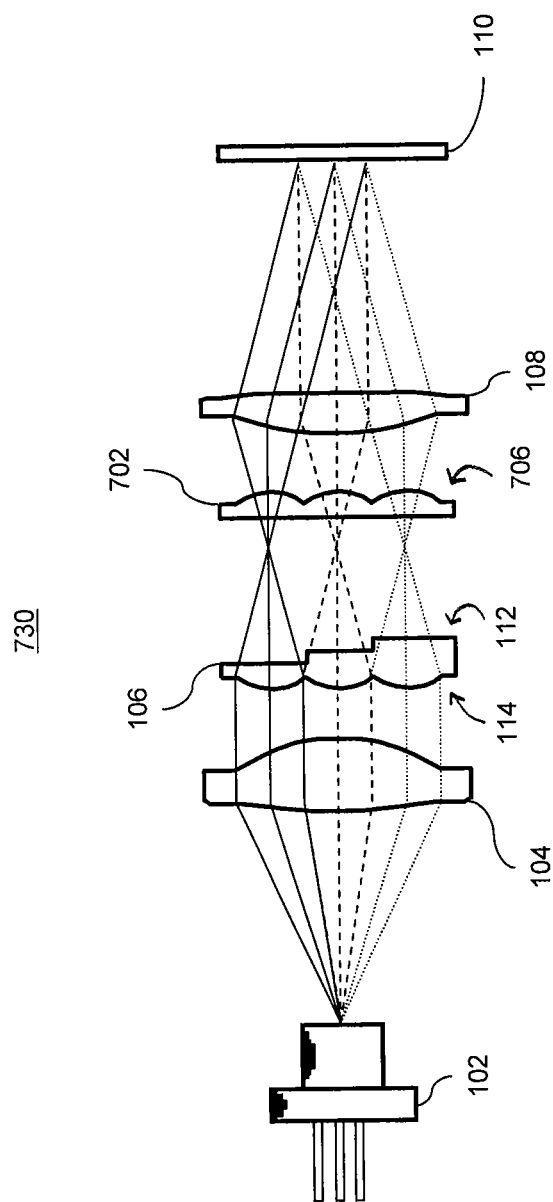

Although FIG. 7A illustrates one configuration of microlens array 702 and despeckle element 106, despeckle element 106 and microlens array 702 are not limited to this configuration. Referring to FIGS. 7B-7D, other configurations of microlens array 702 and despeckle element 106 are shown.

Referring to FIG. 7B, a cross-section diagram of exemplary laser beam homogenizer 710 is shown. Homogenizer 710 is similar to homogenizer 700 (FIG. 7A), except that microlens array 702 is positioned with microlens surface 704 facing field lens 108 rather than facing microlens surface 114 of despeckle element 106.

Referring to FIG. 7C, a cross-section diagram of exemplary laser beam homogenizer 720 is shown. Homogenizer 720 is similar to homogenizer 700 (FIG. 7A), except that despeckle element 106 is positioned with step surface 112 facing microlens surface 706 of microlens array 702 (rather than microlens surface 114 of despeckle element 106 facing microlens surface 706 of microlens array 702 as shown in FIG. 7A).

Referring to FIG. 7D, a cross-section diagram of exemplary laser beam homogenizer 730 is shown. Homogenizer 730 is similar to homogenizer 700 (FIG. 7A), except that despeckle element 106 is positioned with step surface 112 facing microlens array 702 and that microlens array 702 is positioned with microlens surface 706 facing field lens 108.

Figure 8A:
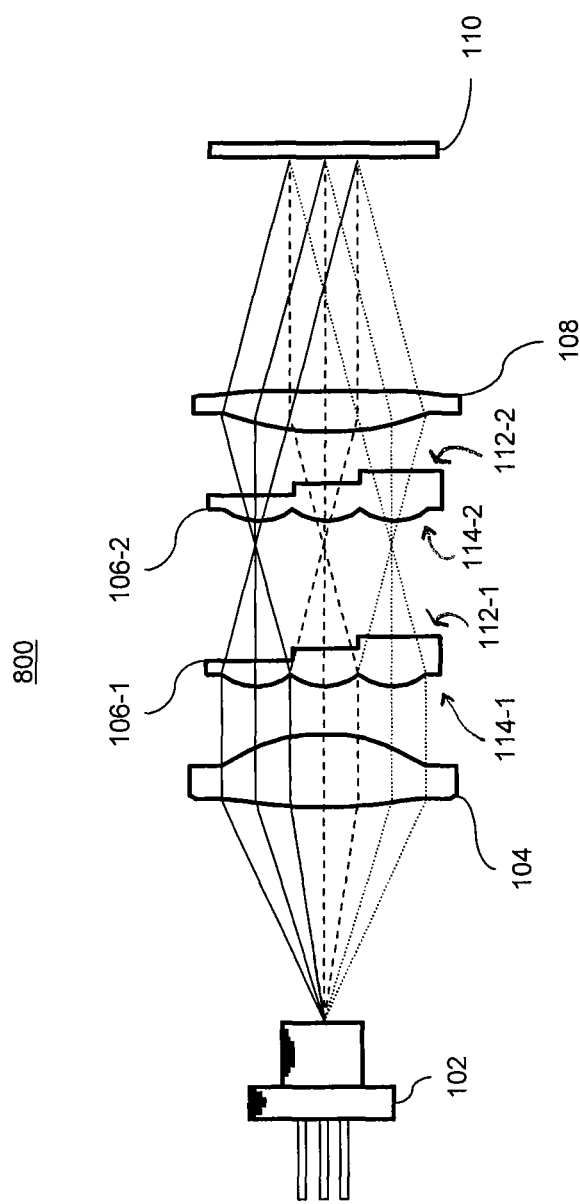
FIGS. 8A, 8B, 8C and 8D are cross-section diagrams of a laser beam homogenizer, according to another exemplary embodiment of the present invention.

Referring next to FIG. 8A, a cross-section diagram of another exemplary laser beam homogenizer 800 is shown with respect to a fast axis of coherent light beam 116. Homogenizer 800 is similar to homogenizer 100 (FIG. 1A), except that homogenizer 800 includes first and second despeckle elements 106-1 and 106-2, respectively. Second despeckle element 106-2 may be positioned between first despeckle element 106-1 and field lens 108, with microlens surface 114-2 of second despeckle element 106-2 facing step surface 112-1 of first despeckle element 106-1. First despeckle element 106-1 may be positioned with microlens surface 114-1 facing collimator 104. Second despeckle element 106-2 may be configured to further increase the optical path difference (to further reduce speckle). Second despeckle element 106-2 may include a phase function that is substantially identical to the phase function of first despeckle element 106-1.

First and second despeckle elements 106-1, 106-2 may be configured as one-dimensional arrays of steps 202 (FIG. 2) and microlenses 204, as described with respect to FIGS. 1A and 1B. According to another embodiment, first and second despeckle elements 106-1, 106-2 may be replaced by two two-dimensional despeckle elements 106' (FIG. 5).

Figure 8B:
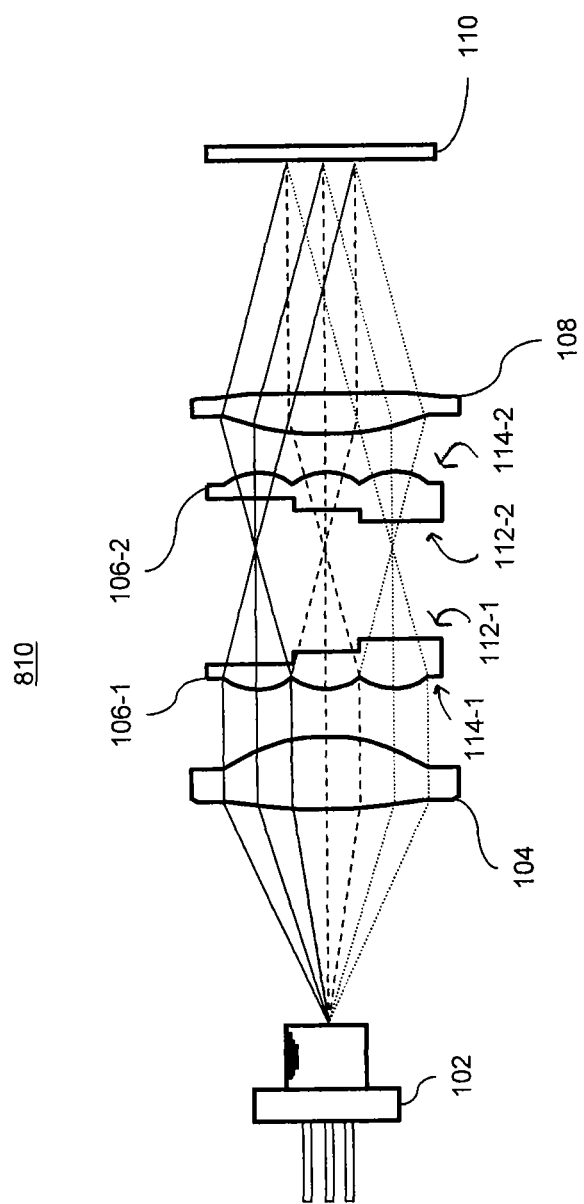
Figure 8C:
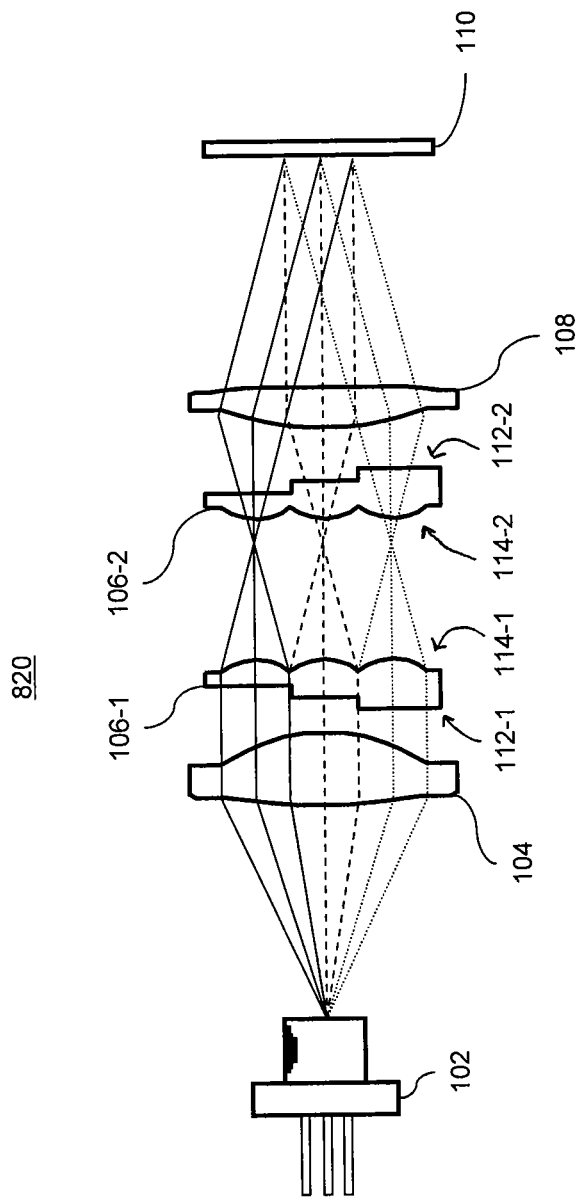
Figure 8D:
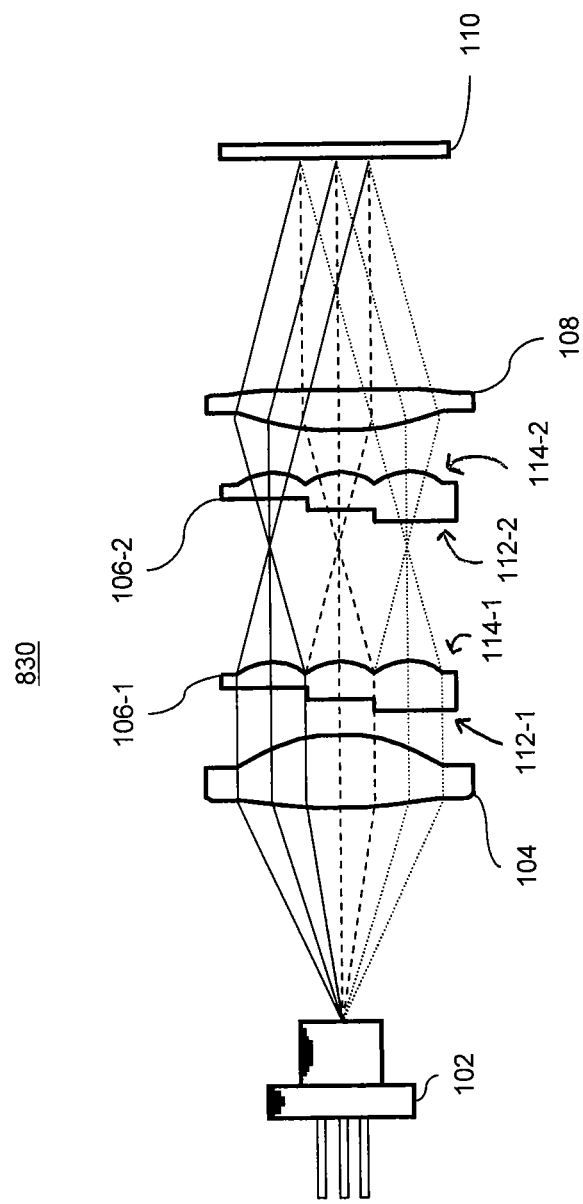

Although FIG. 8A illustrates one configuration of first and second despeckle elements 106-1, 106-2, first and second despeckle elements 106-1, 106-2 are not limited to this configuration. Referring to FIGS. 8B-8D, other configurations of first and second despeckle elements 106-1, 106-2 are shown.

Referring to FIG. 8B, a cross-section diagram of exemplary laser beam homogenizer 810 is shown. Homogenizer 810 is similar to homogenizer 800 (FIG. 8A), except that first and second despeckle elements 106-1, 106-2 are positioned with respective step surfaces 112-1, 112-2 facing each other.

Referring to FIG. 8C, a cross-section diagram of exemplary laser beam homogenizer 820 is shown. Homogenizer 820 is similar to homogenizer 800 (FIG. 8A), except that first and second despeckle elements 106-1, 106-2 are positioned with respective microlens surfaces 114-1, 114-2 facing each other.

Referring to FIG. 8D, a cross-section diagram of exemplary laser beam homogenizer 830 is shown. Homogenizer 830 is similar to homogenizer 800 (FIG. 8A), except that first despeckle element 106-1 is positioned with step surface 112-1 facing collimator 104 and second despeckle element 106-2 is positioned with step surface 112-2 facing first despeckle element 106-1.

Figure 9B:
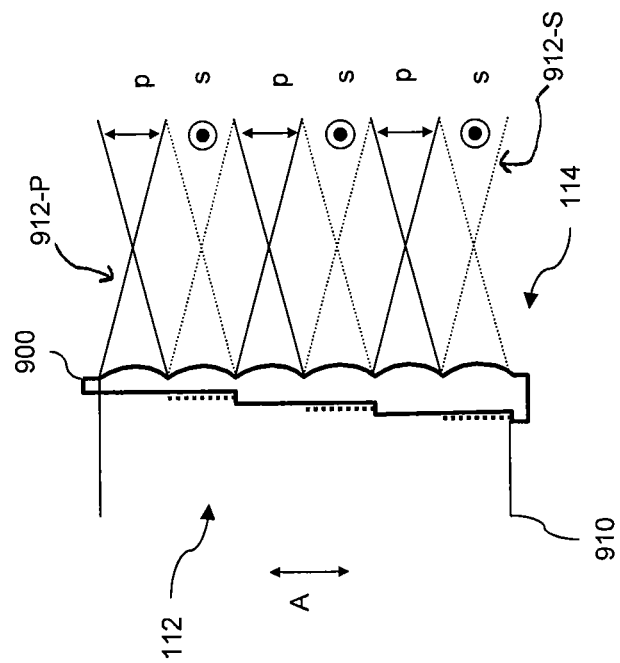
Figure 9A:
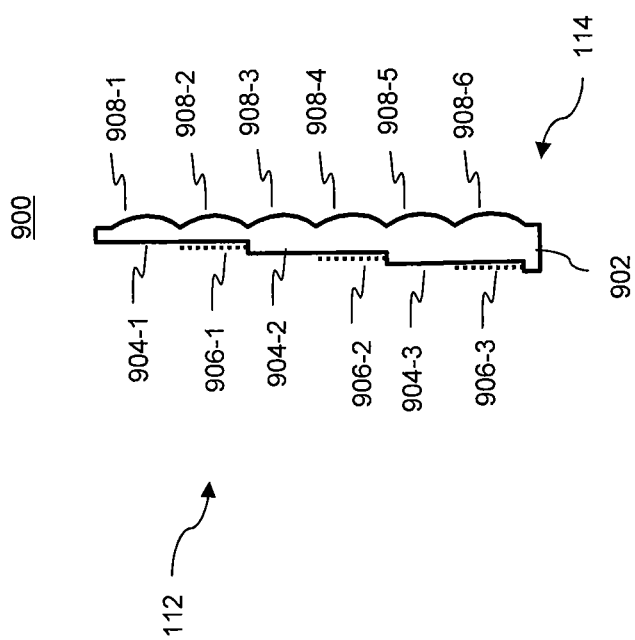

Referring next to FIGS. 9A and 9B, exemplary despeckle element 900 including optical wave plates 906 is shown. In particular, FIG. 9A is a cross-section diagram of despeckle element 900; and FIG. 9B is a cross-section diagram of despeckle element 900 illustrating polarization directions for polarized light 912 passed from microlens surface 114 of despeckle element 900. Despeckle element 900 is similar to despeckle element 106 (FIG. 1), except that despeckle element 900 includes optical wave plates 906.

Despeckle element 900 includes transparent material 902 including physical steps 904 on step surface 112 and microlenses 908 formed on microlens surface 114 opposite step surface 112. Physical steps 904 are formed in a staircase configuration as optical path difference elements, as described above. In addition, despeckle element 900 includes a respective wave plate 906 on a portion of each physical step 904. Wave plate 906 may be used to alter the polarization state of incident light 910 received by despeckle element 900.

In despeckle element 900, each wave plate 906 also represents an optical step. Accordingly, microlenses 908 are in a one-to-one correspondence with optical steps (physical steps 904 and wave plates 906) of despeckle element 900. For example, microlens 908-1 corresponds to physical step 904-1, microlens 908-2 corresponds to wave plate 906-1, microlens 908-3 corresponds to physical step 904-2, microlens 908-4 corresponds to wave plate 906-2, microlens 908-5 corresponds to physical step 904-3 and microlens 908-6 corresponds to wave plate 906-3.

In an exemplary embodiment, wave plate 906 includes a half wave plate, which changes the polarization direction of linear polarized light (i.e., by rotating polarization axis A by 90°, making it orthogonal to incident beam 910). Despeckle element 900 may be used instead of despeckle element 106 (as shown in any of FIG. 1A, 1B, 2, 4, 7A-8D) or despeckle element 106' (FIG. 5), with the addition of a polarizer (not shown) in the optical path between collimator 104 and field lens 108.

As shown in FIG. 9B, in operation, incident light beam 910 having polarized light (for example, p polarized light with a polarization direction indicated by arrow A), passes through despeckle element 900 to produce p-polarized light 912-P and s-polarized light 912-S.

Polarized light 912-P (passed through microlenses 908-1, 908-3, 908-5) are passed without any change in the polarization direction (i.e., as p-polarized light). However, incident light beam 910 is also subject to optical path differences, due to the difference in step heights of physical steps 904. Because of the optical path difference of steps 904-1, 904-2 and 904-3, polarized light 912-P from microlens 908-1 may not coherently interfere with polarized light 912-P from microlens 908-3 and, similarly, polarized light 912-P from microlens 908-5 may not interfere with polarized light 912-P from microlens 908-3.

Polarized light 912-S (passed through respective microlenses 908-2, 908-4, 908-6) is passed with a change in the polarization direction. In addition, incident light beam 910 is subject to optical path differences, due to the difference in step heights of physical steps 904. Because of the optical path difference of steps 904-1, 904-2 and 904-3, polarized light 912-S from microlens 908-2 may not interfere with polarized light 912-S from microlens 908-4 and, similarly, polarized light 912-S from microlens 908-6 may not interfere with polarized light 912-S from microlens 908-4.

Because linearly (e.g., p-polarized) and orthogonally polarized (e.g., s-polarized) beams may not interfere with each other, no step needs to be added to one of the two adjacent positions on the staircase configuration. Accordingly, wave plate 906 may be formed directly on physical step 904 without increasing the step height. Accordingly, a thickness of despeckle element 900 may be reduced to half of the thickness and half the number of physical steps of a despeckle element where the optical steps are formed only using physicals steps as optical path difference elements (e.g., three physical steps in FIGS. 9A and 9B as opposed to six physical steps of a corresponding despeckle element similar to despeckle element 106 of FIG. 1A but having six steps).

Although FIGS. 9A and 9B illustrate a respective wave plate 906 on a portion of each physical step 904, wave plates 906 may also be placed on every other physical step. Referring to FIG. 9C, a cross-section diagram of exemplary despeckle element 920 having another arrangement of optical wave plates 906 and physical steps 904 is shown. Despeckle element 920 is similar to despeckle element 900 (FIG. 9A), except that despeckle element 901 includes four physical steps 904-1, 904-2, 904-3, 904-4 and two wave plates 906-1, 906-2 formed on every other step (e.g., respective physical steps 904-1 and 904-3).

In despeckle element 920, each wave plate 906 represents an optical step. Accordingly, microlenses 908 are in a one-to-one correspondence with optical steps (physical steps 904 and wave plates 906) of despeckle element 920. For example, microlens 908-1 corresponds to wave plate 906-1, microlens 908-2 corresponds to physical step 904-2, microlens 908-3 corresponds to wave plate 906-2 and microlens 908-4 corresponds to physical step 904-4.

Figure 10B:
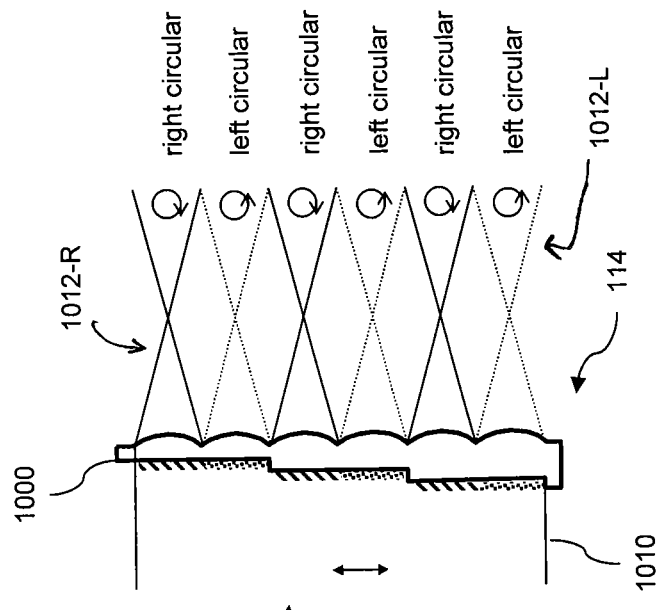
FIGS. 10A and 10B are cross-section diagrams of a despeckle element including optical wave plates, according to another exemplary embodiment of the present invention.
Figure 10A:
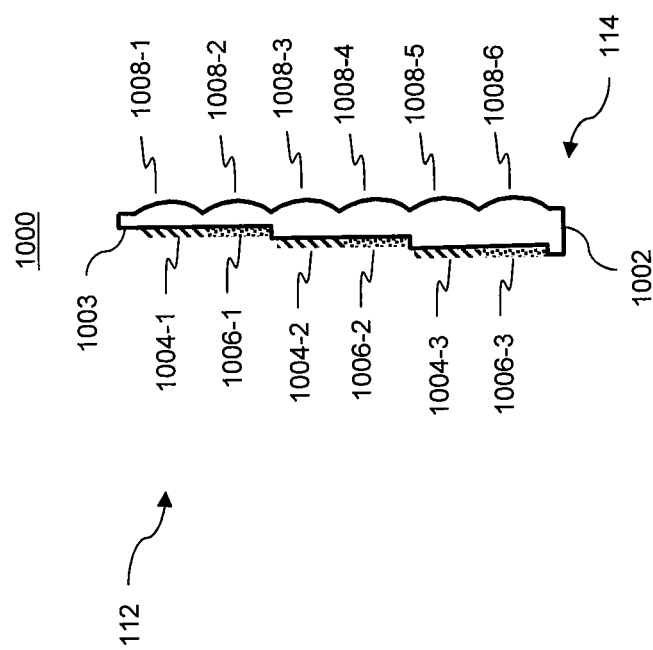

Referring next to FIGS. 10A and 10B, another exemplary despeckle element 1000 including first and second optical wave plates 1004, 1006 is shown. In particular, FIG. 10A is a cross-section diagram of despeckle element 1000; and FIG. 10B is a cross-section diagram of despeckle element 1000 illustrating polarization directions for polarized light 1012 passed from microlens surface 114 of despeckle element 1000. Despeckle element 1000 is similar to despeckle element 900 (FIG. 9A), except that despeckle element 1000 includes respective first and second optical wave plates 1004, 1006.

Despeckle element 1000 includes transparent material 1002 including physical steps 1003 on step surface 112 and microlenses 1008 formed on microlens surface 114 opposite step surface 112. Physical steps 1003 are formed in a staircase configuration as optical path difference elements, as described above. In addition, despeckle element 1000 includes first and second wave plates 1004 and 1006 on each physical step 1003. First and second wave plates 1004 and 1006 may be used to alter the polarization state of incident light beam 1010 received by despeckle element 1000.

In despeckle element 1000, first and second wave plates 1004 and 1006 also represent optical steps. Accordingly, microlenses 1008 are in a one-to-one correspondence with the optical steps (first and second wave plates 1004 and 1006). For example, microlens 1008-1 corresponds to first wave plate 1004-1, microlens 1008-2 corresponds to second wave plate 1006-1, microlens 1008-3 corresponds to first wave plate 1004-2, microlens 1008-4 corresponds to second wave plate 1006-2, microlens 1008-5 corresponds to first wave plate 1004-3 and microlens 1008-6 corresponds to second wave plate 1006-3.

In an exemplary embodiment, first wave plate 1004 includes a quarter wave plate and second wave plate 1006 includes a three-quarter wave plate. The quarter wave plate (i.e., first wave plate 1004) changes linearly polarized light to right circular polarized light and the three-quarter wave plate (i.e., second wave plate 1006) changes linearly polarized light to left circular polarized light. Despeckle element 1000 may be used instead of despeckle element 106 (as shown in any of FIG. 1A, 1B, 2, 4, 7A-8D) or despeckle element 106' (FIG. 5), with the addition of a polarizer (not shown) in the optical path between collimator 104 and field lens 108.

As shown in FIG. 10B, in operation, incident light beam 1010 having linearly polarized light (for example, p polarized light with a polarization direction indicated by arrow A), passes through despeckle element 1000 to produce right-circular-polarized light 1012-R and left-circular-polarized light 1012-L.

Polarized light 1012-R (passed through respective microlenses 1008-1, 1008-3, 1008-5) have right circular polarization (from respective first wave plates 1004-1, 1004-2, 1004-3). In addition, incident light beam 1010 is subject to optical path differences, due to the difference in step heights of physical steps 1003. Because of the optical path differences, polarized light 1012-R from microlens 1008-1 may not interfere with polarized light 1012-R from microlens 1008-3 and, similarly, polarized light 1012-R from microlens 1008-5 may not interfere with polarized light 1012-R from microlens 1008-3.

Polarized light 1012-L (passed through respective microlenses 1008-2, 1008-4, 1008-6) have left circular polarization (from respective second wave plates 1006-1, 1006-2, 1006-3). In addition, incident light beam 1010 is subject to optical path differences, due to the difference in step heights of physical steps 1003. Because of the optical path differences, polarized light 1012-L from microlens 1008-2 may not interfere with polarized light 1012-L from microlens 1008-4 and, similarly, polarized light 1012-L from microlens 1008-6 may not interfere with polarized light 1012-L from microlens 1008-4.

Because right circular polarization and left circular polarization may not interfere with each other, no step needs to be added to one of the two adjacent positions on the staircase configuration. Accordingly, both first wave plate 1004 and second wave plate 1006 may be formed directly on physical step 1003 without increasing the step height. Thus, the thickness of despeckle element 1000 may be reduced to half of the thickness and half the number of physical steps (e.g., three physical steps as opposed to six physical steps) compared to a step of despeckle element 106 (FIG. 1A) but having six steps.

Figure 11A:
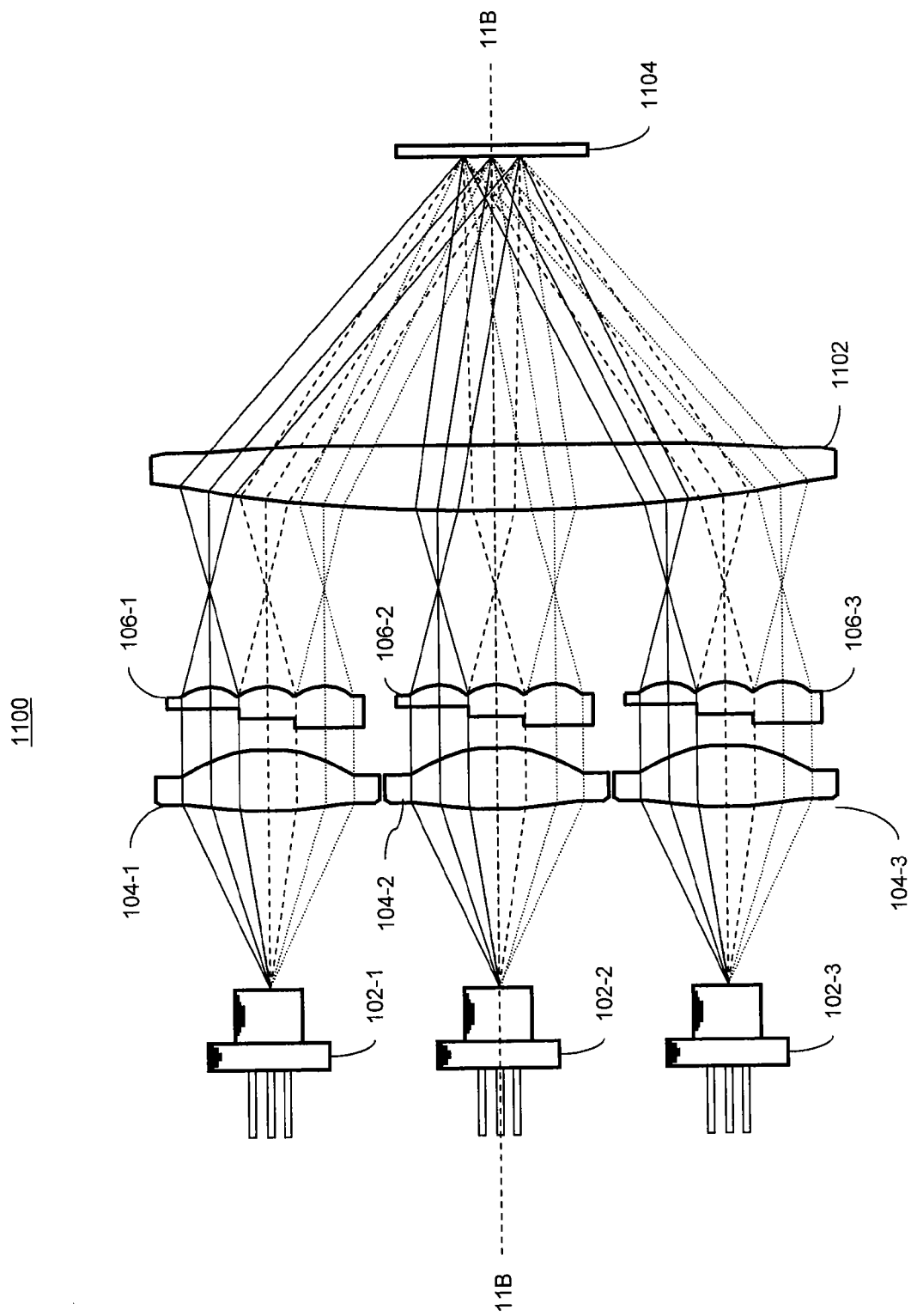
FIGS. 11A and 11B are cross-section diagrams of a despeckling laser array with respect to a fast axis and a slow axis of the incident laser beams, respectively, according to an exemplary embodiment of the present invention.
Figure 11B:
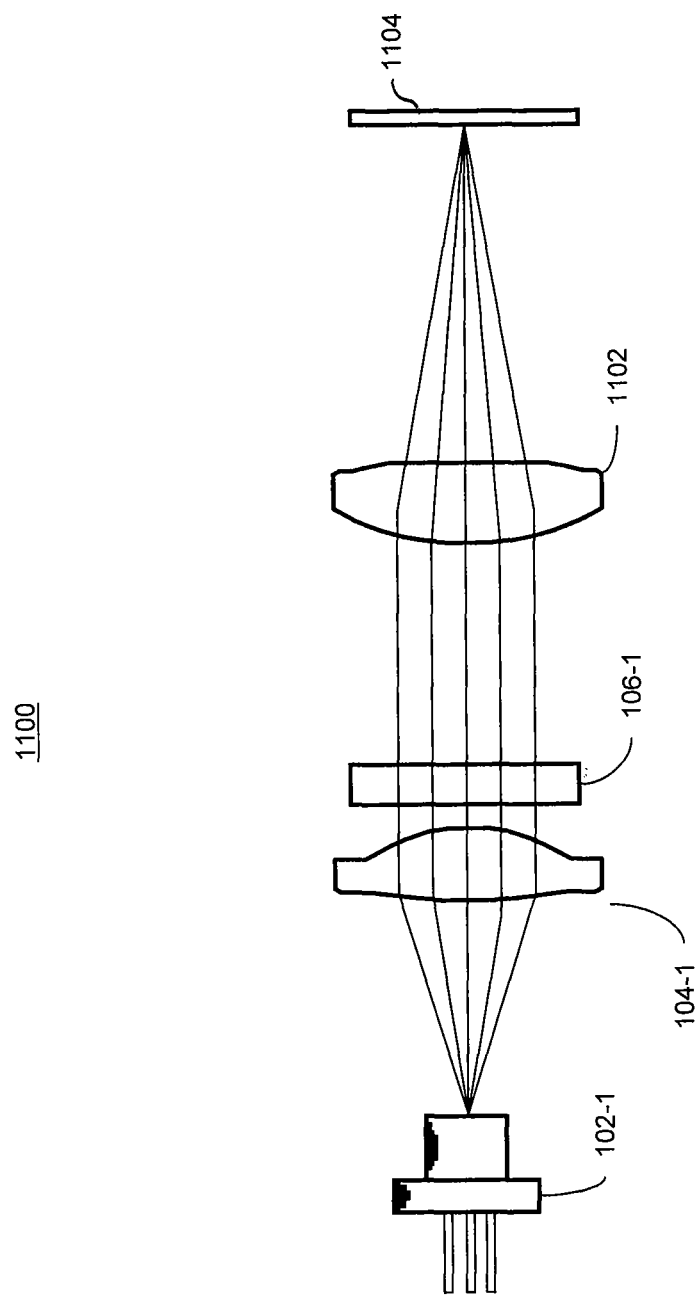

Referring next to FIGS. 11A and 11B, cross-section diagrams are shown of an exemplary despeckling laser array 1100 (also referred to herein as array 1100), according to an embodiment of the present invention. In particular, FIG. 11A is a cross-section diagram of despeckling laser array 1100 with respect to a fast axis of laser sources 102; and FIG. 1B is a cross-section diagram of array 1100 along line 11B-11B with respect to a slow axis of laser sources 102. Despeckling laser array 1100 is similar to homogenizer 100 (FIGS. 1A and 1B), except that array 1100 includes a plurality of laser sources 102-1, 102-2, 102-3 having a plurality of corresponding collimators 104-1, 104-2, 104-3 and a plurality of corresponding despeckle elements 106-1, 106-2, 106-3. Beamlets from the plurality of despeckle elements 106-1, 106-2, 106-3 are superimposed together by field lens 1102 at image plane 1104.

Because laser sources 102-1, 102-2, 102-3 are independent laser sources, they are not correlated with each other and may not coherently interfere with each other. Thus, beamlets from the plurality of despeckle elements 106-1, 106-2, 106-3 may be combined by a common field lens 1102 and may overlap on image plane 1104. The combined beam profile is thus averaged out and may produce a more uniform intensity profile.

Although three laser sources are illustrated in FIG. 11A, it is understood that array 1100 may include two or more laser sources 102. Despeckle element 106 may be positioned as shown in FIG. 1A or as shown in FIG. 4. Array 1100 may also include two despeckle elements 106 per laser source 102, as described above with respect to FIGS. 8A-8D. Array 1100 may also include an additional microlens array, as described above with respect to FIGS. 7A-7D. Although FIGS. 11A and 11B illustrate laser sources 102 having an elliptical beam shape, laser sources 102 may have a circular beam shape, and despeckle elements 106 may be replaced with two-dimensional despeckle elements 106' (FIG. 5). Despeckle elements 106 may also include one or more optical wave plates, as described above with respect to FIGS. 9A-10B. It is understood that any one or more of the embodiments described herein may be combined into one optical system including a common field lens 1102.

Figure 12C:
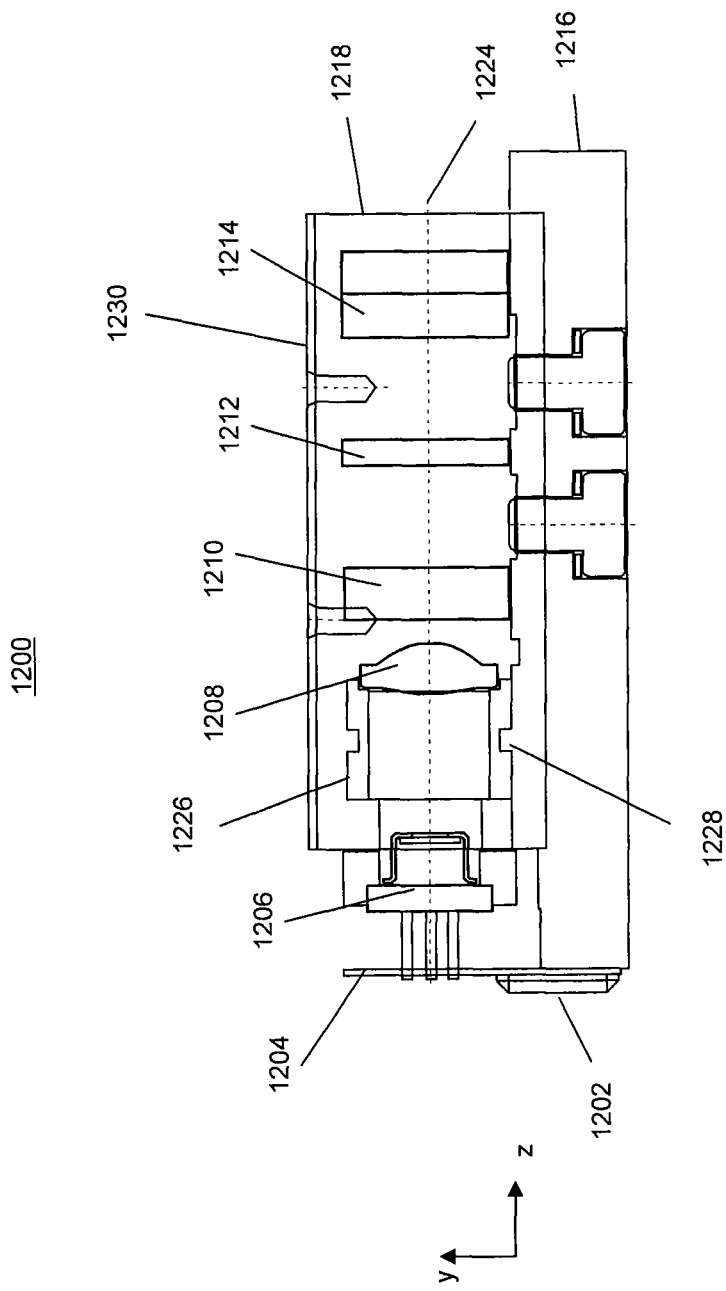

Referring next to FIGS. 12A-12C, an exemplary despeckling laser array assembly 1200 (also referred to herein as assembly 1200) is shown. In particular, FIG. 12A is a side-plan view diagram of assembly 1200 with respect to the x and y axes; FIG. 12B is a cross-section diagram of assembly 1200 along line 12B-12B with respect to the x and z axes (relative to fast axes 1222); and FIG. 12C is a cross-section diagram of assembly 1200 along line 12C-12C with respect to the y and z axes (relative to slow axes 1224).

Assembly 1200 includes a plurality of laser sources 1206 each having a corresponding collimator 1208, despeckle element 1210 and microlens array 1212. Beamlets from the plurality of microlens arrays 1212 are combined by common field lens 1214. Assembly 1200 also includes a plurality of driver integrated circuits (ICs) 1202 mounted on flexible printed circuit board 1204. Driver ICs 1202 may be configured to drive respective laser sources 1206.

Elements 1206, 1208, 1210, 1212 and 1214 form despeckling laser array 1220 (also referred to herein as array 1220). Array 1220 is similar to array 1100 (FIGS. 11A and 11B), except that array 1220 is assembled in chassis 1218 and includes microlens arrays 1212. Although in an exemplary embodiment chassis 1218 is formed from molded aluminum, chassis 1218 may be formed from any material suitable for housing array 1220.

Each laser source 1206 may be mounted in a separate holder. Each holder may be adhered to chassis 1218 after optical axis adjustment with respect tip-tilt and/or x/y correction (i.e., the correction of tilts of the incident light beam with respect to fast axis 1222). Each laser source 1206 may then be electrically connected to a respective driver IC 1202 via circuit board 1204.

Each collimator 1208 may be mounted in respective holder 1226, where holder 1226 may include adjustment notch 1228 (shown in FIG. 12C). Notch 1228 may be configured to move holder 1226 along the optical axis, in order to adjust the amount of collimation.

Despeckle elements 1208, microlens arrays 1212 and field lens 1214 may be adhered to chassis 1218. Once array 1220 is suitably secured in chassis 1218, top lid 1230 may be placed on chassis 1218 and may be secured to chassis 1218 (for example, via screws). Chassis 1218 may be secured to bottom base plate 1216 (for example, via bolts).

Although despeckle elements 1210 and microlens arrays 1212 are positioned as shown in FIG. 12B, despeckle elements 1210 and microlens arrays 1212 may be positioned according to any of the configurations described above with respect to FIGS. 7A-7D. Furthermore, although assembly 1200 is illustrated as including despeckle elements 1210 and microlens arrays 1212, it is understood that assembly 1200 is not limited to the illustrated configuration. Rather, assembly 1200 may not include microlens arrays 1212 (as described above with respect to FIGS. 1A and 4) or may include additional despeckle elements instead of microlens arrays 1212 (as described above with respect to FIGS. 8A-8D).

Although FIGS. 12A-12C illustrate laser sources 1206 having elliptical beam shapes, laser sources 1206 may have a circular beam shape. Accordingly, despeckle elements 1210 may be replaced with two-dimensional despeckle elements 106' (FIG. 5) and microlens arrays 1212 may be replaced by two-dimensional microlens arrays (similar to the microlens array shown in FIG. 5). Despeckle elements 1210 may also include one or more optical wave plates, as described above with respect to FIGS. 9A-10B. It is understood that any one or more of the embodiments described herein may be combined into assembly 1200.

Figure 13C:
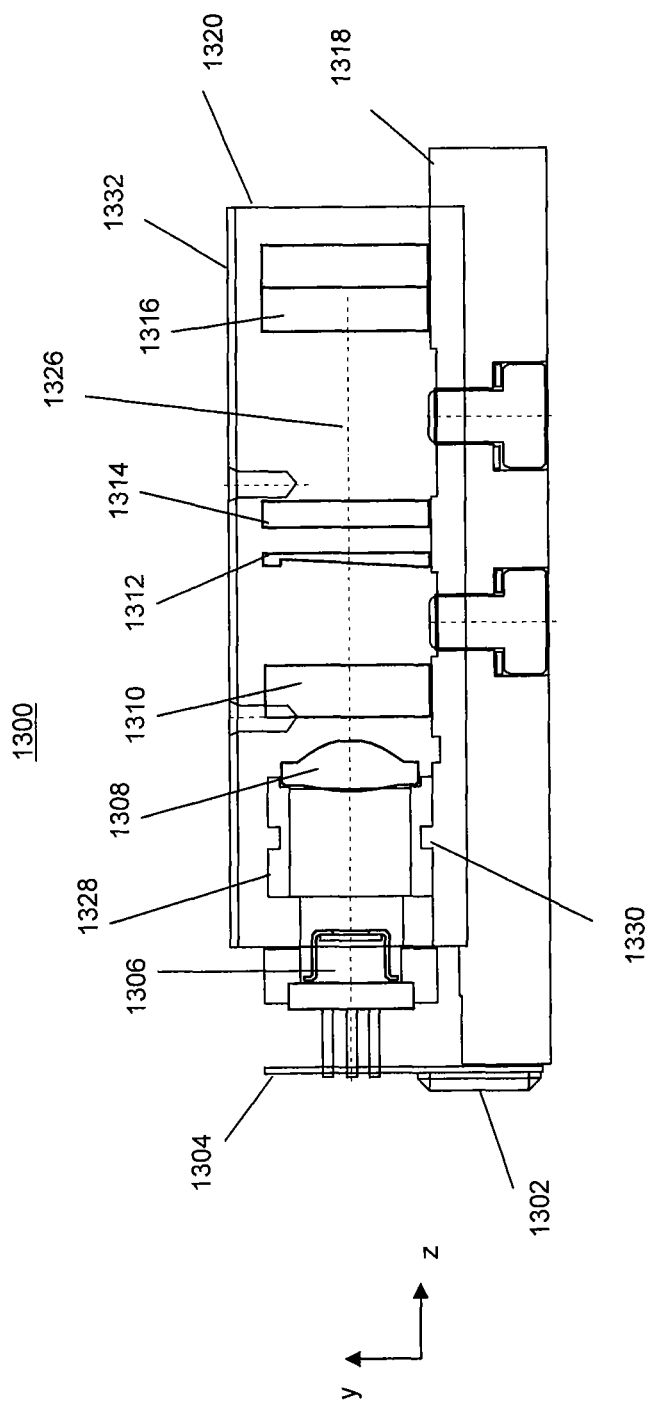

Referring next to FIGS. 13A-13C, another exemplary despeckling laser array assembly 1300 (also referred to herein as assembly 1300) is shown. In particular, FIG. 13A is a side-plan view diagram of assembly 1300 with respect to the x and y axes; FIG. 13B is a cross-section diagram of assembly 1300 along line 13B-13B with respect to the x and z axes (relative to fast axes 1324); and FIG. 13C is a cross-section diagram of assembly 1300 along line 13C-13C with respect to the y and z axes (relative to slow axes 1326).

Assembly 1300 includes a plurality of laser sources 1306 each having a corresponding collimator 1308, despeckle element 1310, deflecting element 1312 and microlens array 1314. Beamlets from the plurality of microlens arrays 1314 are combined by common field lens 1316. Assembly 1300 also'includes a plurality of driver ICs 1302 mounted on flexible printed circuit board 1304.

Elements 1306, 1308, 1310, 1312, 1314 and 1316 form despeckling laser array 1322 (also referred to herein as array 1322). Assembly 1300 is similar to assembly 1200 (FIGS. 12A-12C), except that array 1322 of assembly 1300 includes deflecting elements 1312.

In an exemplary embodiment, deflecting elements 1312 include optical wedges which may be used to adjust the tilt of slow axis 1326. Deflecting elements 1312 may be configured to align all of the beamlets from each despeckle element 1310 to a same position in the image plane (not shown). Deflecting elements 1312 may be positioned at any suitable position between respective collimators 1308 and field lens 1316, provided that deflecting elements 1312 are positioned in the optical beam path of respective laser source 1306.

Assembly 1300 may be assembled in a similar manner as described above with respect to assembly 1200 (FIGS. 12A-12C). Each laser source 1306 may be mounted in a separate holder, which may be adhered to chassis 1320 after optical axis adjustment with respect tip-tilt and/or x/y correction. Each laser source 1306 may then be electrically connected to a respective driver IC 1302 via circuit board 3204. Each collimator 1308 may be adjustably mounted in respective holder 1328 via respective adjustment notch 1330. Despeckle elements 1310, deflecting elements 1312, microlens array 1314 and field lens 1316 may be adhered to chassis 1320. Once array 1322 is suitably secured in chassis 1320, top lid 1332 may be placed on chassis 1320 and may be secured to chassis 1320 (for example, via screws). Chassis 1320 may be secured to bottom base plate 1318 (for example, via bolts).

It is understood that FIGS. 13A-13C represent an example embodiment of assembly 1300. As described above with respect to FIGS. 12A-12C, any one or more of the embodiments described herein may be combined into assembly 1300.

Figure 14:
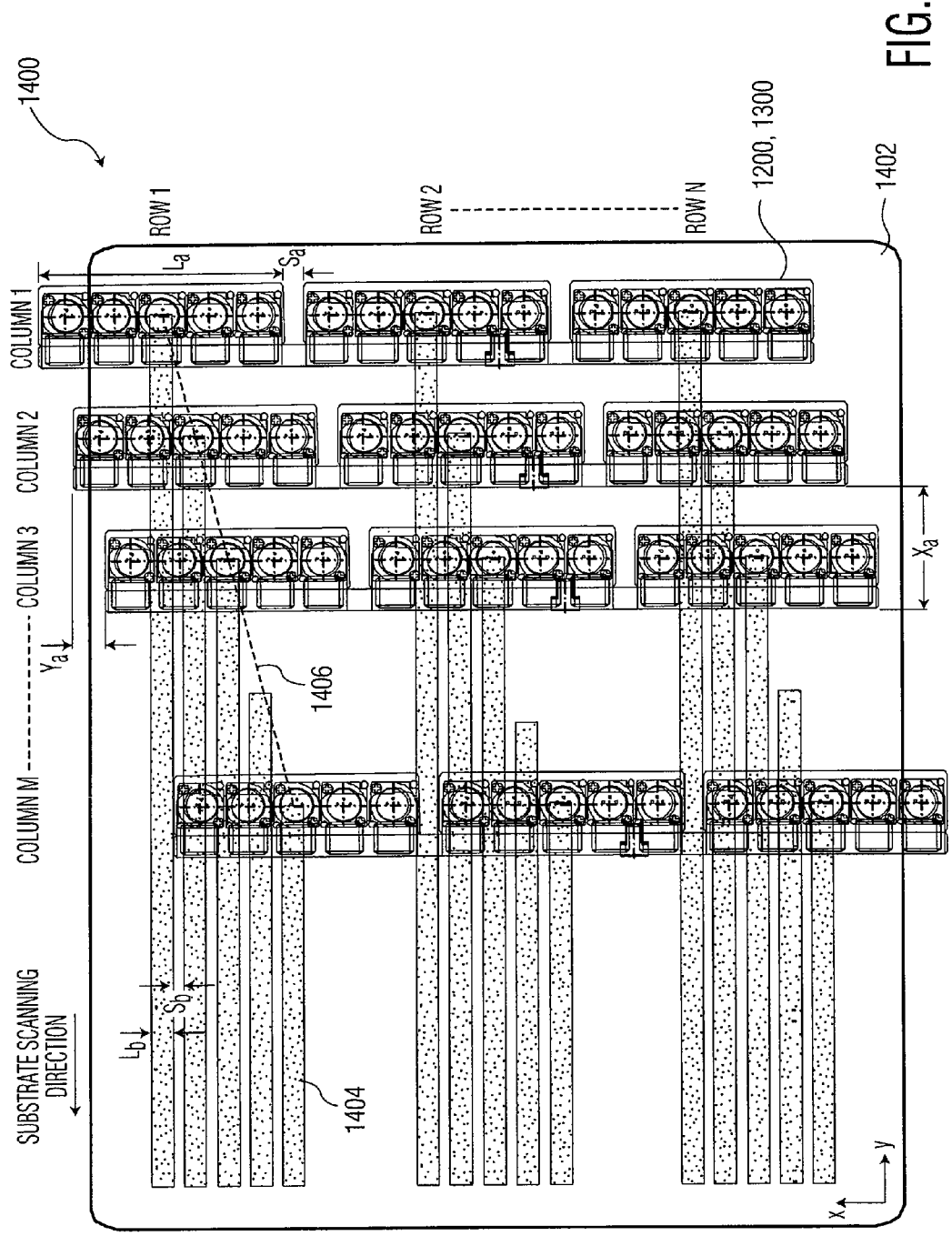
FIG. 14 is a top-plan view diagram of a system for annealing a substrate, according to an exemplary embodiment of the present invention.

Referring next to FIG. 14, a top-plan view diagram of an exemplary system 1400 for annealing substrate 1402 is shown. System 1400 includes a two-dimensional arrangement of assemblies 1200 (FIGS. 12A-12C) (and/or assemblies 1300, FIGS. 13A-13C) along column and row directions, configured to produce annealing lines 1404 (i.e., annealed portions) of substrate 1402. Substrate 1402 may include any suitable substrate for being annealed by laser sources. For example, substrate 1402 may include, without being limited to, amorphous silicon for large organic LED displays.

Assemblies 1200 (1300) may be shifted relative to each other in the column direction by an amount $X_a$. A beam line width $L_b$ of annealing lines 1404 is typically smaller than a width $L_a$ of assembly 1200 (assembly 1300). Accordingly, in order to anneal the entire surface of substrate 1402, assemblies 1200 (assemblies 1300) may be arranged in an interlace configuration (e.g., similar to an inkjet line head), such that assemblies 1200 (1300) are shifted by an amount $Y_a$ in the row direction. Accordingly, in operation, assemblies 1200 (1300) of a particular row appear to produce output light along direction 1406 relative to the substrate scanning direction.

For a beam line width $L_b$ which is equal to an annealing width, a gap $S_b$ between annealing lines 1404 may be selected with respect to laser array width $L_a$ and a gap $S_a$ between assemblies 1200 (1300) according to Eq. (9) as:

$$(L_b - S_b)M = L_a + S_a \qquad (9)$$

for a total number of columns M for the case of one scanning period. The shift $Y_a$ of assemblies 1200 (1300) in the row direction may be given by Eq. (10) as:

$$Y_a = L_b + S_b \qquad (10)$$

The shift $X_a$ of assemblies 1200 (1300) in the column direction may be arbitrarily selected. For a given shift $Xa$, a total length of system 1400 in the column direction becomes $MX_a$.

In FIG. 14, a total of M×N number of assemblies 1200 (1300) are positioned above substrate 1402, where N represents a total number of rows. FIG. 14 represents an example embodiment of system 1400. It is understood that system 1400 may include fewer columns of assemblies 1200 (1300), to scan the entire surface of substrate 1402. For example, fewer columns of assemblies 1200 (1300) may be scanned multiple times while being shifted in the row direction (similar to operation of a serial inkjet printer).

Figure 15:
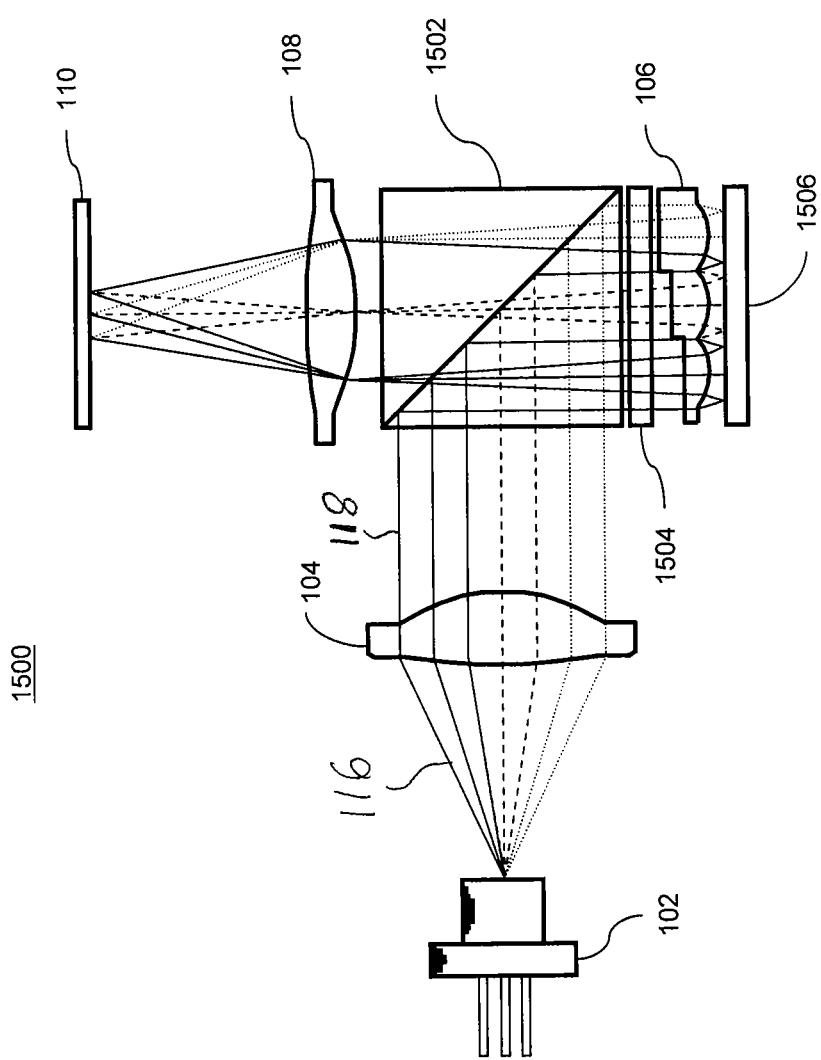
FIG. 15 is a cross-section diagram of a laser beam homogenizer, according to another exemplary embodiment of the present invention.

Referring next to FIG. 15, a cross-section diagram of another exemplary laser beam homogenizer 1500 is shown with respect to a fast axis of coherent light beam 116. Homogenizer 700 is similar to homogenizer 100 (FIG. 1A), except that homogenizer 700 includes polarization beam splitter 1502, optical wave plate 1504 and mirror 1506 in addition to despeckle element 106.

In operation, collimated light beam 118 from collimator 104 is reflected and linearly polarized by polarization beam splitter 1502 towards wave plate 1504. Wave plate 1504 may be configured to alter the polarization state of linearly polarized light beam to a circularly polarized light beam. In an exemplary embodiment, wave plate 1502 is a quarter wave plate.

The circularly polarized light beam passes through despeckle element 106 and is reflected by mirror 1506, to be redirected through despeckle element 106 for a second time. Accordingly, a despeckle element 106, in homogenizer 1500 operates as a tandem configuration. Beamlets passed through despeckle element for the second time are again passed by wave plate 1504 and changed from circular polarization to linearly polarized beamlets. The linear polarized beamlets are passed through polarization beam splitter 1502 and directed toward field lens, where they are focused onto image plane 110.

Homogenizer 1500 operates in a manner similar to homogenizer 820 (FIG. 8C), except that homogenizer 1500 includes mirror 1506, rather than a second despeckle element. Mirror 1506 allows the beamlets to pass through despeckle element 106 a second time, to further increase the optical path difference (to further reduce speckle). Homogenizer 1500 may be configured in a more compact manner than homogenizer 820 (FIG. 8C).

Several embodiments of the invention have been described herein. It is understood that the present invention is not limited to these embodiments and that different embodiments may be used together.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A despeckle element comprising:
a transparent material having a first surface including a plural number of optical steps and a second surface opposite the first surface, the second surface having a plural number of microlenses, each of the number of optical steps being in a one-to-one correspondence with at least one of the microlenses,
one of the first surface and the second surface is configured to receive collimated light having a coherence length and a remaining one of the first surface and the second surface is configured to pass the collimated light separated into a plurality of beamlets corresponding to the number of microlenses,
a height of each step of at least two of the optical steps is configured to produce an optical path difference of the collimated light away from: a) a zero path difference peak of visibility of the collimated light, and b) any side mode peaks of visibility of the collimated light; and the collimated light is a coherent light beam pulsed to include multi-mode oscillation.

2. The despeckel element according to claim 1, wherein the multi-mode oscillation reduces a coherence of the coherent light beam and the optical steps are configured to further reduce the coherence of the coherent light beam not reduced by the multi-mode oscillation, to substantially despeckle the coherent light beam.

3. The despeckle element according to claim 1, wherein the at least two of the optical steps are configured as a one-dimensional staircase and the number of microlenses are configured as a one-dimensional array of microlenses.

4. The despeckle element according to claim 1, wherein the at least two of the optical steps are configured as a two-dimensional array of optical steps and the number of microlenses are configured as a two-dimensional array of microlenses.

5. The despeckle element according to claim 4, wherein the two-dimensional array of optical steps is formed in a staircase configuration.

6. The despeckle element according to claim 4, wherein the number of optical steps are formed with a symmetric height distribution.

7. The despeckle element according to claim 1, wherein each step of the number of optical steps has a same width.

8. The despeckle element according to claim 1, wherein at least one step of the number of optical steps has a different width relative to the remaining optical steps.

9. The despeckle element according to claim 8, wherein at least one microlens corresponding to the at least one step has a different radius of curvature relative to the remaining microlenses, to have a focal length substantially equal to a focal length of the remaining microlenses.

10. The despeckle element according to claim 1, wherein the at least two of the optical steps are configured as a staircase and each optical step has a same increase in height.

11. The despeckle element according to claim 1, wherein the at least two of the optical steps are configured as a staircase and at least one of the at least two optical steps has a different increase in height relative to the remaining one or ones of the at least two optical steps.

12. The despeckle element according to claim 1, wherein the collimated light is linearly polarized with a polarization direction,
the number of optical steps includes a plurality of optical wave plates configured to change the polarization direction of the collimated light,
at least two microlenses of the plurality of microlenses correspond to each step, and
each optical wave plate is disposed on a portion of each step of the at least two of the optical steps such that each optical wave plate is in a one-to-one correspondence with a respective one of the at least two microlenses corresponding to the step.

13. The despeckle element according to claim 1, wherein the collimated light includes linearly polarized light,
the number of optical steps includes a plurality of first and second optical wave plates configured to respectively change the linearly polarized light to right circular polarized light and left circular polarized light, and
each of the first and second optical wave plates is disposed on each step of the at least two optical steps such that each of the first and second optical wave plates is in a one-to-one correspondence with a respective microlens.

14. A coherent beam homogenizer comprising:
at least one despeckle element configured to receive a collimated light beam having a coherence length and to split the collimated light beam into a number of beamlets, the at least one despeckle element comprising:
  a first surface including a plural number of optical steps, each of at least two of the optical steps configured to produce an optical path difference of the collimated light beam away from: a) a zero path difference peak of visibility of the collimated light, and b) any side mode peaks of visibility of the collimated light; and
  a second surface, opposite the first surface, having a plural number of microlenses, each of the number of optical steps being in a one-to-one correspondence with at least one of the microlenses, the number of beamlets corresponding to the number of microlenses;
the collimated light is a coherent light beam pulsed to include multi-mode oscillation, and
a field lens configured to superimpose the number of beamlets together at an image plane.

15. The coherent beam homogenizer according to claim 14, wherein the at least one despeckle element includes two despeckle elements.

16. The coherent beam homogenizer according to claim 14, wherein the collimated light beam is linearly polarized, the number of optical steps includes a plurality of optical wave plates configured to change a polarization state of the collimated light beam, and each optical wave plate disposed on at least a portion of each step of the at least two of the optical steps.

17. The coherent beam homogenizer according to claim 14, further comprising a microlens array disposed between the at least one despeckle element and the field lens.

18. The coherent beam homogenizer according to claim 14, further comprising an optical wedge disposed between the at least one despeckle element the field lens.

19. The coherent beam homogenizer according to claim 14, wherein the at least two of the optical steps are configured as a one-dimensional staircase and the number of microlenses are configured as a one-dimensional array of microlenses.

20. The coherent beam homogenizer according to claim 14, wherein the at least two of the optical steps are configured as a two-dimensional array of optical steps and the number of microlenses are configured as a two-dimensional array of microlenses.

21. The coherent beam homogenizer according to claim 14, further comprising:
  a beam splitter disposed between the at least one despeckle element and the field lens, the beam splitter configured to direct the collimated light beam to one of the first surface and the second surface of the at least one despeckle element;
  a mirror disposed proximate a remaining surface of the first surface and the second surface of the at least one despeckle element, the mirror configured to redirect the number of beamlets passed through the at least one despeckle element to the remaining surface, such that the at least despeckle element produces a further number of beamlets, the beam splitter configured to direct the further number of beamlets to the field lens.

22. The coherent beam homogenizer according to claim 21, wherein the beam splitter includes a polarization beam splitter and the homogenizer further includes an optical plate disposed between the polarization beam splitter and the at least one despeckle element.

23. The coherent beam homogenizer according to claim 14, further comprising:
  an optical source configured to generate a coherent light beam having the coherence length, the optical source being pulsed to broaden a wavelength bandwidth of the coherent light beam; and
  a collimator configured to receive the coherent light beam and to generate the collimated light beam.

24. The coherent beam homogenizer according to claim 23, wherein the optical source is pulsed with a pulse duration of between about 0.5 ns and about 100 ns.

25. The coherent beam homogenizer according to claim 23, wherein:
  the optical source includes a plurality of optical sources configured to generate a plurality of coherent light beams,
  the collimator includes a plurality of collimators configured to generate a plurality of collimated light beams from the respective plurality of coherent light beams,
  the at least one despeckle element includes a plurality of despeckle elements configured to receive the respective plurality of collimated light beams and to produce corresponding plural numbers of beamlets, and
  the field lens is configured to superimpose the plural number of beamlets together at the image plane.

26. The coherent beam homogenizer according to claim 25, wherein each collimator is disposed in a holder, the holder being configured to adjust a position of the respective collimator along a respective optical axis.

27. The coherent beam homogenizer according to claim 23 wherein the optical source is selected from a group consisting of: a semiconductor laser, a vertical cavity surface emitting laser (VCSEL), a superluminescent diode (SLD), a light emitting diode (LED), a gas laser, a solid-state laser, a disc laser and a fiber laser.

\* \* \* \* \*